US012185176B2

(12) United States Patent
Wifvesson et al.

(10) Patent No.: US 12,185,176 B2
(45) Date of Patent: Dec. 31, 2024

(54) AMF RE-ALLOCATION DUE TO SLICING

(71) Applicant: Telefonaktiebolaget LM Ericsson (publ), Stockholm (SE)

(72) Inventors: Monica Wifvesson, Lund (SE); Vlasios Tsiatsis, Solna (SE); Peter Hedman, Helsingborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 312 days.

(21) Appl. No.: 17/634,614

(22) PCT Filed: Aug. 14, 2020

(86) PCT No.: PCT/EP2020/072841
§ 371 (c)(1),
(2) Date: Feb. 11, 2022

(87) PCT Pub. No.: WO2021/032610
PCT Pub. Date: Feb. 25, 2021

(65) Prior Publication Data
US 2022/0338079 A1    Oct. 20, 2022

Related U.S. Application Data

(60) Provisional application No. 62/888,930, filed on Aug. 19, 2019.

(51) Int. Cl.
*H04W 36/38*   (2009.01)
*H04W 36/00*   (2009.01)
(Continued)

(52) U.S. Cl.
CPC ..... *H04W 36/385* (2013.01); *H04W 36/0038* (2013.01); *H04W 48/16* (2013.01);
(Continued)

(58) Field of Classification Search
CPC .......... H04W 36/06; H04W 48/16; H04W 72/0453; H04W 48/06; H04W 36/385; H04W 36/0038; H04L 5/0098
See application file for complete search history.

(56) References Cited

U.S. PATENT DOCUMENTS

2018/0227873 A1*  8/2018  Vrzic ................... H04W 28/26
2019/0141584 A1*  5/2019  Ben Henda ......... H04W 12/041
(Continued)

FOREIGN PATENT DOCUMENTS

WO   WO-2019074415 A1 *  4/2019  ........ H04W 36/0055

OTHER PUBLICATIONS

Ericsson, "Discussion about the AMF re-allocation due to slicing", 3GPP TSG-SA WG3 Meeting #96, Aug. 26-30, 2019, pp. 1-10, Wroclaw, Poland, S3-192887.
(Continued)

*Primary Examiner* — Kevin C. Harper
*Assistant Examiner* — Salma Ayad
(74) *Attorney, Agent, or Firm* — COATS & BENNETT, PLLC

(57) ABSTRACT

In a wireless communication network implementing network slicing (NS), an Initial Access and Mobility Management Function (AMF) for a user equipment (UE) in one NS is able to re-allocate a UE to a Target AMF in a different NS, despite not being able to directly communicate with the Target AMF due to NS security restrictions. In a first embodiment, the Initial AMF transfers the UE context—including its security context—to a Default AMF. The Default AMF has the capability to communicate with network functions in different NSes. The Default AMF transfers the UE context to the Target AMF. In a second embodiment, a security key Kamf is horizontally derived in a manner that avoids NS security conflicts. The derived key is transferred
(Continued)

to the UE and Target AMF, which establish a security context. In a third embodiment, the Initial AMF allocates a Token, and transfers it, along with the UE security context (directly or via RAN) to the Default AMF. The Default AMF then transfers the security context to the Target AMF.

14 Claims, 20 Drawing Sheets

(51) Int. Cl.
*H04W 48/16* (2009.01)
*H04W 36/06* (2009.01)
*H04W 48/06* (2009.01)
*H04W 72/0453* (2023.01)

(52) U.S. Cl.
CPC ............ *H04W 36/06* (2013.01); *H04W 48/06* (2013.01); *H04W 72/0453* (2013.01)

(56) References Cited

U.S. PATENT DOCUMENTS

| | | | |
|---|---|---|---|
| 2019/0268753 A1* | 8/2019 | Chen | H04W 12/0471 |
| 2021/0360742 A1* | 11/2021 | Liao | H04W 48/16 |
| 2021/0385722 A1* | 12/2021 | Won | H04W 12/037 |
| 2022/0201638 A1* | 6/2022 | Arrobo Vidal | H04W 48/08 |
| 2024/0090079 A1* | 3/2024 | Talebi Fard | H04W 76/40 |

OTHER PUBLICATIONS

Ericsson, "Excluding sensitive information to be sent in clear", 3GPP TSG-SA WG2 Meeting #128bis, Oct. 15-19, 2018, pp. 1-22, Dongguan, P.R. China, S2-1811310.

Samsung, "Registration procedure using the temporary User ID", SA WG2 Meeting #120, Mar. 27-31, 2017, pp. 1-11, Busan, South Korea, S2-171911.

Ericsson, "AMF reallocation and slicing", 3GPP TSG-SA WG3 Meeting #96, Aug. 26-30, 2019, pp. 1-3, Wroclaw, Poland, S3-192888.

Ericsson, "Guidance on initial NAS message protection", 3GPP TSG-SA WG2 Meeting #129, Oct. 15-19, 2018, pp. 1-5, Dongguan, P. R. China, S2-1810248.

3rd Generation Partnership Project, Technical Specification Group Services and System Aspects; Procedures for the 5G System; Stage 2 (Release 15), 3GPP TS 23.502 V15.5.1, Apr. 2019, pp. 1-355.

Ericsson, "Discussion about the AMF re-allocation due to slicing", 3GPP TSG-SA WG3 Meeting #95-BIS, Jun. 24-28, 2019, pp. 1-8, Sapporo (Japan), S3-19xyzw.

Huawei et al., "Solving registration failure in initial registration procedure with AMF reallocation", 3GPP TSG-SA WG3 Meeting #95, May 6-10, 2019, pp. 1-4, Reno (US), S3-191413.

Huawei et al., Registration failure in registration procedure with AMF reallocation caused by slicing, 3GPP TSG-SA WG3 Meeting #95, May 6-10, 2019, pp. 1-4, Reno (US), S3-191411.

3rd Generation Partnership Project, "5G; Non-Access-Stratum (NAS) protocol for 5G System (5GS); Stage 3 (3GPP TS 24.501 V15.4.0 Release 15)," ETSI TS 124 501 V15.4.0, Jul. 2019, pp. 1-498.

* cited by examiner

AMF RE-ALLOCATION DUE TO SLICING

TECHNICAL FIELD

The present invention relates generally to wireless communication networks, and in particular to re-allocating a wireless device to a different Access and Mobility Management Function in a different network slice.

BACKGROUND

Wireless communication networks are widely deployed, and almost ubiquitous in many parts of the world. As technology advances, network architecture continues to evolve to accommodate more users, a greater variety of services, lower latency and higher throughput, and more efficient use of the radio frequency spectrum.

Wireless Network Model

FIG. 1 depicts a very high-level view of a wireless communication network, as standardized by 3GPP. The network includes a (large number of) user equipment (UE), at least one radio access network (RAN), and core network (CN). The UE is a wireless device (which may be mobile) used by the user to wirelessly access the network. Although the term "user equipment" is historical in the industry, modern UEs may include Machine Type Communications (MTC) devices (also known as Internet of Things, or IoT, devices). These devices are embedded in products and systems, and may perform, e.g., monitoring, meter-reading, process control, and the like. As such, these devices often have no user interface, and no "user" in the conventional sense. The RAN comprises base stations (BSs, also known as Node-B, eNB, gNB) which are responsible for providing wireless radio communication to the UE and connecting the UE to the core network. The CN comprises nodes implementing several types of core network functions, which are responsible for various functions such as handling the mobility of the UE, interconnecting to data networks, packet routing and forwarding, authentication and accounting, and other responsibilities, e.g. the AMF (Access and Mobility Management Function.

Network Business Model

Wireless communication networks are operated, and their services are offered, by mobile network operators (MNOs). In order to use a particular wireless communication network offered by a particular MNO, users are required to have a contractual relationship with that MNO, that relationship being generally called a subscription.

The MNOs provide services to the users with valid subscriptions. These users use the services, e.g., send Short Message Service (SMS) messages (also known as texts), make phone calls, and access the Internet. The MNOs charge these users for the services they have used through the MNOs' billing or charging systems, and the users pay according to the billed amount.

This business model is supported by several security features built into the mobile networks. For example, the network can authenticate the users and determine if they have valid subscriptions; the traffic belonging to services such as SMS, phone calls, Internet data, are transported in secure way so that the users are billed correctly according to their usage of the traffic.

The traffic itself is of two types in general, one is control plane (CP) and another is user plane (UP), wherein the CP traffic is used for management of the traffic, and UP traffic carries the actual data. The secure transport of the traffic is achieved by confidentiality/ciphering and integrity protection. Confidentiality/ciphering in this context means encryption of messages, which makes it infeasible for unauthorized parties to decrypt and read the original message. Integrity protection in this context means the sender adding a security token or a message authentication code (MAC) to the message that the receiver can verify, which makes it infeasible for unauthorized parties to tamper the original message without the receiver detecting the tampering. These cryptographic operations are hence essential to support the business model under which wireless communication networks operate.

A UE is typically connected to a single base station in order to use the mobile network services such phone calls, messaging, and data transmissions, and when a UE does not have any data to send, its connection is idle.

Network Slicing

One of the features of 5G mobile networks is network slicing. Network slicing is an important capability to bring network resource utilization efficiency, deployment flexibility, and support fast growing over the top (OTT) applications and services. A network slice is viewed as a logical end-to-end network that can be dynamically created. It provides telecommunication services and network capabilities, which may vary (or not) from slice to slice, and distinct RAN and CN Slices will exist. A given UE may access multiple slices over the same RAN, and each slice may serve a particular service type with agreed upon Service-level Agreement (SLA). A Network Slice is defined within a Public Land Mobile Network (PLMN) and includes the Core Network Control Plane and User Plane Network Functions as well as the 5G Access Network (AN).

A wireless device may provide Network Slice Selection Assistance Information (NSSAI) parameters to the network to help it select a RAN and a CN part of a slice instance for the device. A single NSSAI may lead to the selection of several slices. The network may also use device capabilities, subscription information, and local operator policies to do the selection.

A NSSAI is a collection of smaller components, Session Management NSSAIs (SM-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several NS instances of the same type, e.g., to isolate traffic related to different services into different slices.

In general, a wireless device that accesses one slice of a network may not access other slices, absent a specific procedure to do so. For example, the slices employ authentication and encryption using separate keys.

Network Registration

For a UE to join a wireless communication network, a registration procedure takes place as a first step. The detailed registration procedure is outlined in 3GPP Technical Standard (TS) 23.502, v.16.0.2, § 4.2.2.2.2 "General Registration". The FIG. 4.2.2.2.2-1, "Registration procedure," from that section is reproduced for convenience in FIG. 2. The UE is registered in a core network function known as the Access and Mobility Management Function (AMF).

In some cases, for example due to slicing requirements or AMF set deployment constraints, a UE cannot continue to be served by the Initial AMF with which it registered. This is covered in said TS 23.502 § 4.2.2.2.3 "Registration with AMF re-allocation." FIG. 4.2.2.2.3-1: "Registration with AMF re-allocation procedure" from that section is reproduced for convenience in FIG. 3.

Problem when the Initial AMF Cannot Communicate with the Target AMF

The AMF re-allocation procedure outlined in FIGS. 2 and 3 results in the UE and Initial AMF sharing a security context after step 2 in FIG. 3, or after step 9 in FIG. 2. Therefore, encryption and integrity protection keys that could be used for the secure communication between the UE and the Initial AMF have been derived. The last part of step 9 in FIG. 2 is the NAS Security Mode Command (SMC) that takes the security context into use between the UE and the Initial AMF. After the NAS SMC procedure, the Initial AMF receives the initial registration request, which may have slicing information such a Network Slice Selection Assistance Information (NSSAI). Based upon this slicing information, the Initial AMF may determine that it is not the proper AMF to serve the UE, and so performs a look-up for an appropriate AMF (steps 6a, 6b in FIG. 3).

A problematic situation is case (B) in FIG. 3, when the Target AMF (the AMF that was discovered to fulfil the requirements to serve the UE with respect to slicing) cannot be contacted by the Initial AMF in order to transfer the security context shared between the UE and the Initial AMF. As a result, step 5 in FIG. 3 will be followed, which implies that the Target AMF will try to authenticate the UE again by issuing an unprotected NAS message (AUTHENTICATION REQUEST, or AUTHRQ for short). According to the rules in 3GPP TS 24.501, v.16.0.2, § 4.4.4.2 "Integrity checking of NAS signalling messages in the UE" this unprotected AUTHRQ message will be dropped by the UE, since it already has a security context with the network (albeit with the Initial AMF, not the Target AMF).

Note that in the case of step 7(A) there is no problem, since the security context is transferred from the Initial AMF to the Target AMF. Therefore, the Target AMF—whether or not it decides to re-authenticate the UE—has the security context with which it could protect the AUTHRQ.

This problem is recognized in the 3GPP SA3 contribution Tdoc S3-191411, and one solution is proposed in 3GPP SA3 contribution Tdoc S3-191413. The problem with the solution of Tdoc S3-191413 is that it introduces a new message, "AMF reallocation notification message," which causes the UE to delete the security context shared between itself and the Initial AMF. This solution is not ideal since the UE removes a working security context before the next security context is established.

AMF re-allocation will need to consider Network Slice isolation requirements that imply that network functions deployed as part of specific NS (Network Slice) may not be allowed to communicate directly with network functions deployed as part of other NSes. Also, certain information should not be transferred between NSes, e.g., security information used in a NS. Solutions to these issues that impact the design or operation of the UE are not optimal, due to the vey large number of legacy UEs deployed.

Please note that the Background section above is provided to place embodiments of the present invention in technological and operational context, to assist those of skill in the art in understanding their scope and utility. Approaches described in the Background section could be pursued but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

In various embodiments disclosed and claimed herein, an Initial AMF in one NS is able to re-allocate a UE to a Target AMF in a different NS. In a first embodiment, the Initial AMF transfers the UE context—including its security context—to a Default AMF. The Default AMF has the capability to communication with network functions in different NSes. The Default AMF transfers the UE context to the Target AMF. In a second embodiment, a security key Kamf' is horizontally derived in a manner that avoids NS security conflicts. The derived key is transferred to the UE and Target AMF, which establish a security context. In a third embodiment, the Initial AMF allocates a Token, and transfers it, along with the UE security context (directly or via RAN) to the Default AMF. The Default AMF then transfers the security context to the Target AMF.

One embodiment relates to a method, performed by a wireless device, for changing an Access and Mobility Management Function (AMF) in a wireless communication network. A security context is established with an Initial AMF in a first network slice. A registration request message is sent to the Initial AMF. A registration accept message is received from a Target AMF in a second network slice. The Initial AMF transferred a security context with the wireless device to the Target AMF via a Default AMF which is able to securely communicate with both the Initial AMF and the Target AMF.

Another embodiment relates to a method, performed by a first core network node performing Initial Access and Mobility Management Function (Initial AMF) for a wireless device, of transferring control of the wireless device to a Target AMF. A security context is established with the wireless device. A Registration Request message is received from the wireless device. It is determined that the Target AMF should control the wireless device, the Target AMF being in a different network slice. The security context for the wireless device is transferred to a Default AMF which is able to securely communicate with both the Initial AMF and the Target AMF.

Yet another embodiment relates to a method, performed by a second core network node performing Default Access and Mobility Management Function (Default AMF) for wireless devices across network slices, of transferring control of the wireless device from an Initial AMF to a Target AMF. A security context for the wireless device is received from the Initial AMF in a first network slice. The security context for the wireless device is transferred to the Target AMF in a second network slice.

Still another embodiment relates to a wireless device operative in a wireless communication network. The wireless device includes processing circuitry and communication circuitry operatively connected to the processing circuitry. The processing circuitry is configured to cause the wireless device to: establish a security context with an Initial AMF in a first network slice; send a registration request message to the Initial AMF; and receive a registration accept message from a Target AMF in a second network slice. The Initial AMF transferred a security context with the wireless device to the Target AMF via a Default AMF which is able to securely communicate with both the Initial AMF and the Target AMF.

Still another embodiment relates to a first core network node operative as an Initial Access and Mobility Management Function, Initial AMF, for a wireless device, of transferring control of the wireless device to a Target AMF. The first core network node includes processing circuitry and communication circuitry operatively connected to the processing circuitry. The processing circuitry is configured to cause the first core network node to: establish a security context with the wireless device; receive a Registration Request message from the wireless device; determine that the Target AMF should control the wireless device, the Target AMF being in a different network slice; and transfer the security context for the wireless device to a Default AMF which is able to securely communicate with both the Initial AMF and the Target AMF. Still another embodiment relates to a second core network node operative as a Default Access and Mobility Management Function, Default AMF, for a wireless device (10, 20) across network slices for transferring control of the wireless device (10, 20) from an Initial AMF (40) to a Target AMF in a wireless communication network. The second core network node includes processing circuitry and communication circuitry operatively connected to the processing circuitry. The processing circuitry is configured to cause the second core network node to: receive a security context for the wireless device from the Initial AMF in a first network slice; and transfer the security context for the wireless device to the Target AMF in a second network slice.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Several embodiments of the present invention will now be described. At least some of these embodiments may be described as applicable in certain contexts and/or wireless network types for illustrative purposes, but the embodiments are similarly applicable in other contexts and/or wireless network types not explicitly described.

First Embodiment

Figure 4:
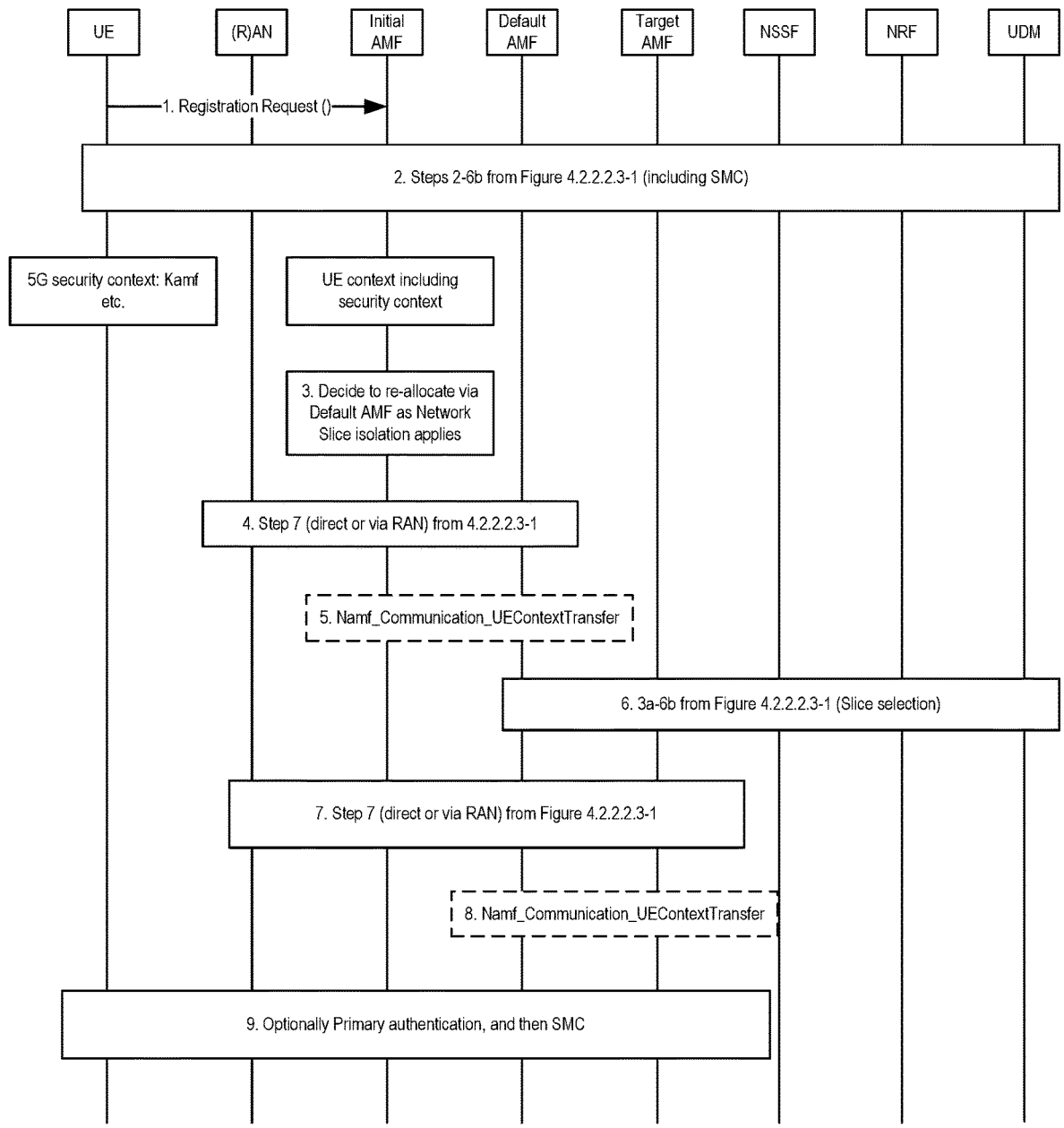
FIG. 4 is a signaling diagram showing re-allocation of a UE from an Initial AFM to a Target AMF via a Default AMF

FIG. 4 depicts a representative signaling diagram depicting one embodiment of a solution, which is based on the observation that the main cause of the problem is that the UE and the network already share a security context, but the network function which holds the context (Initial AMF) cannot transfer it to the Target AMF nor directly communicate with the Target AMF.

The solution, in this embodiment, is for the network (Initial AMF) to communicate with an intermediate entity or network function that is deployed in a way such that it is allowed to communicate with all network functions in the deployed Network Slices. It is proposed to use the Default AMF for this purpose, and the high-level principle is that the network functions communicate via the Default AMF for maintaining communication isolation requirements.

Figure 1:
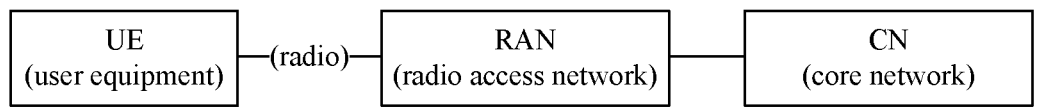
FIG. 1 is a block diagram of a wireless communication network.
Figure 2:
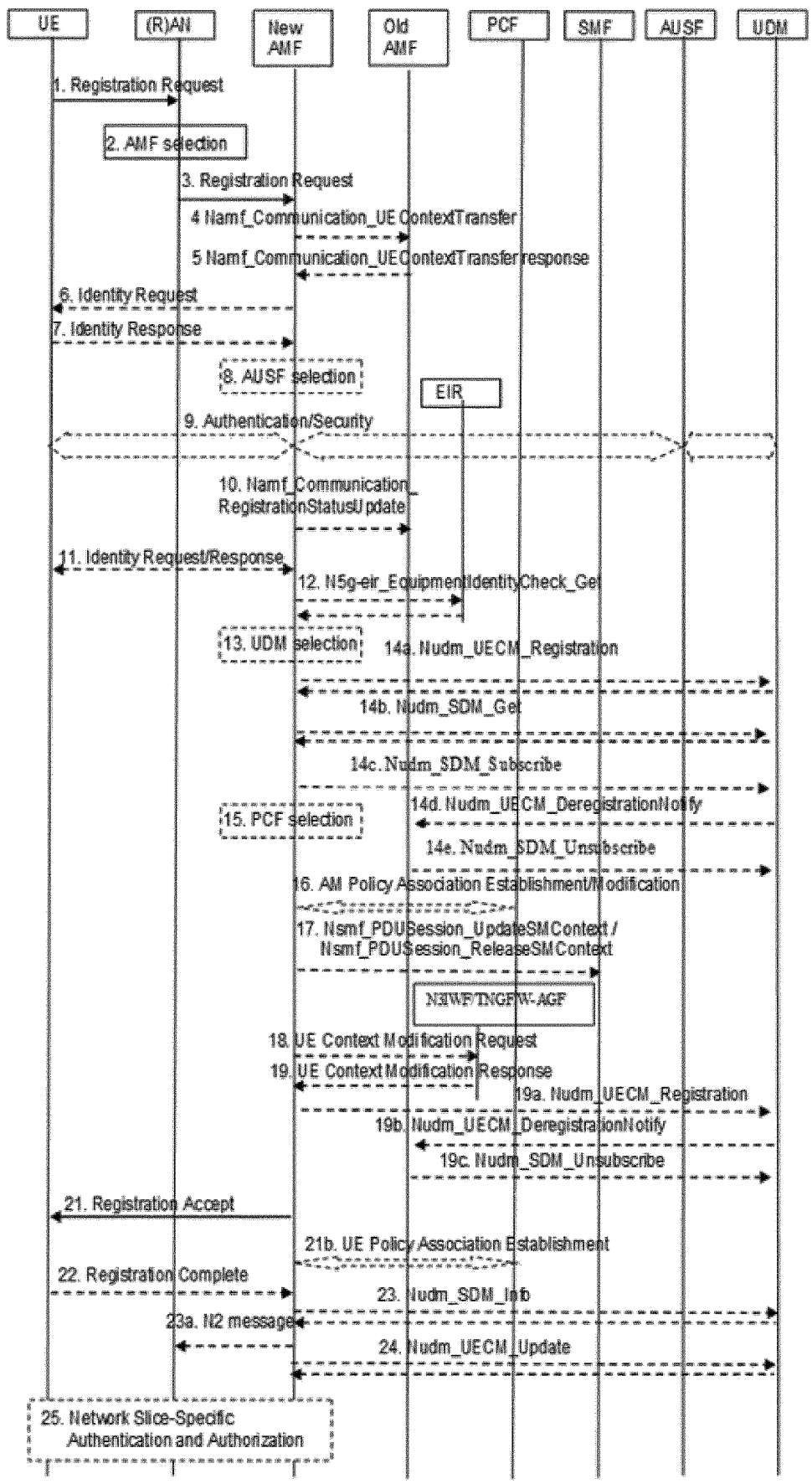
FIG. 2 is FIG. 4.2.2.2.2-1 from 3GPP TS 23.502, v.16.0.2.
Figure 3:
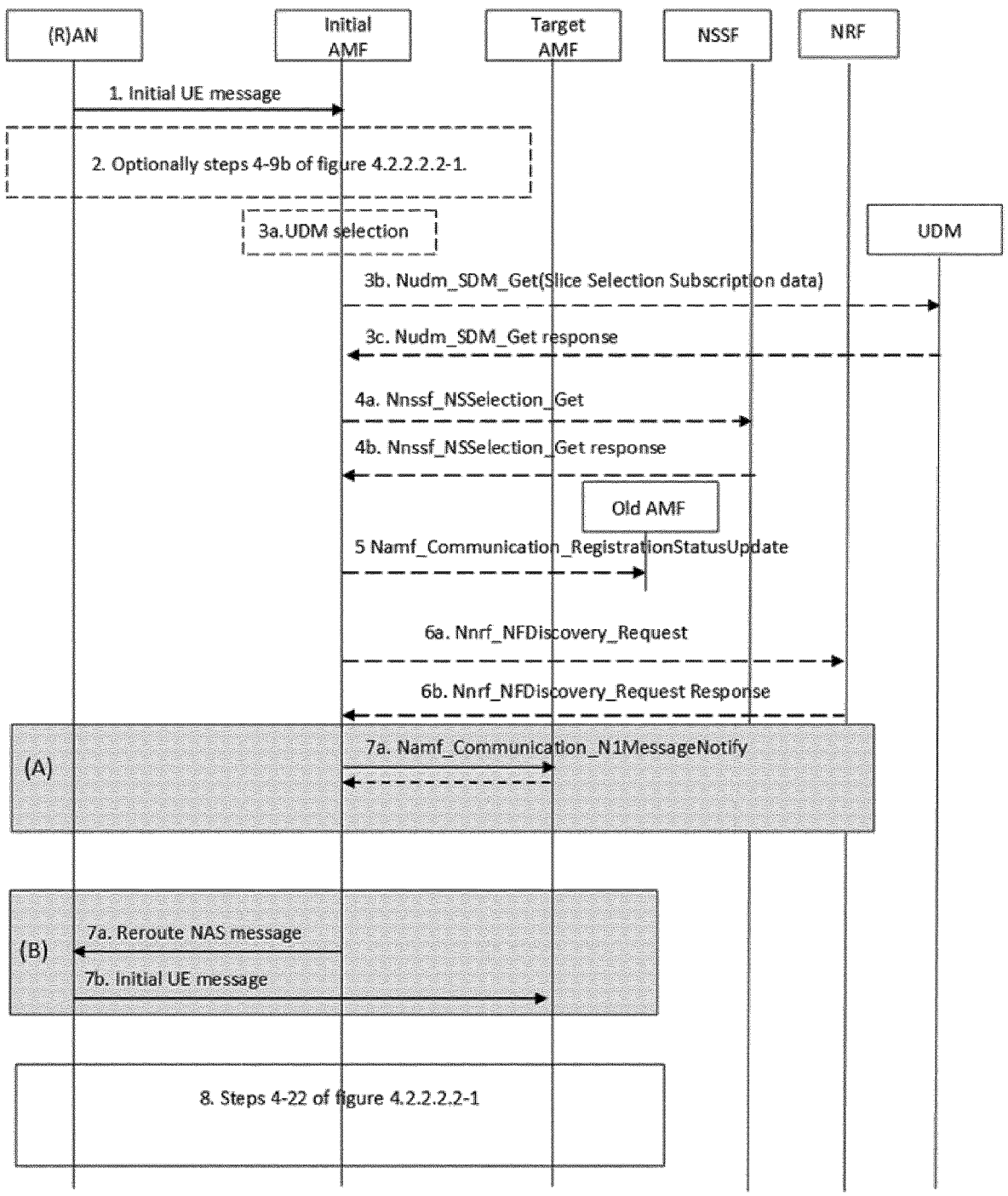
FIG. 3 is FIG. 4.2.2.2.3-1 from 3GPP TS 23.502, v.16.0.2.

First, the UE sends a NAS message (Registration Request) to the Initial AMF (step 1). The UE registration proceeds as described in the above-mentioned 3GPP TS 23.502—in particular, steps 2-6b as depicted in FIG. 4.2.2.2.3-1 of that standard (presented herein as FIG. 3) (step 2). This results in a security context between the UE and the Initial AMF. The Initial AMF then decides to re-allocate the UE to another AMF, via the Default AMF, as Network Slice isolation applies (step 3). This decision may be based on local configured information, or by information received from NSSF (e.g., NSSF sending Default AMF address, in addition to Target AMF address, or Allowed NSSAI).

Re-allocation of the UE from the Initial AMF to the Default AMF then occurs per 3GPP TS 23.502—in particular, step 7A or 7B as depicted in FIG. 4.2.2.2.3-1 of that standard (presented herein as FIG. 3) (step 4). For 7A, this occurs as a direct message to the Default AMF using N1MessageNotify (as specified in 3GPP TS 23.502), optionally extended with Target AMF address. For 7B, which reroutes via RAN, REROUTE NAS REQUEST could be extended with GUAMI of the Initial AMF, so as to allow the Default AMF to retrieve the UE/MM context from Initial AMF. Also, the NAS message sent via RAN may be protected with a CN specific protection, e.g., certificates or public keys. In this case, the Default AMF may then, for example, fetch a public key when fetching the UE/MM context from Initial AMF. Alternatively, it may have been provisioned prior. If the UE/MM context was not transferred in step 4, then the Default AMF fetches it (step 5).

If the Default AMF did not get enough information for re-allocation of the UE to the Target AMF from the Initial AMF, then the Default AMF performs Network Slice selection (step 6), e.g., to get the Target AMF address from NSSF. This occurs per 3GPP TS 23.502—in particular, steps 3a-6b as depicted in FIG. 4.2.2.2.3-1 of that standard (presented herein as FIG. 3).

Re-allocation of the UE from the Initial AMF to the Default AMF then occurs per 3GPP TS 23.502—in particular, step 7A or 7B as depicted in FIG. 4.2.2.2.3-1 of that standard (presented herein as FIG. 3) (step 7). For 7A, this occurs as described above, but no additions to NGAP message are needed. For 7B, this occurs as described above, to allow the Target AMF to retrieve from the Default AMF.

Second Embodiment

Figure 5:
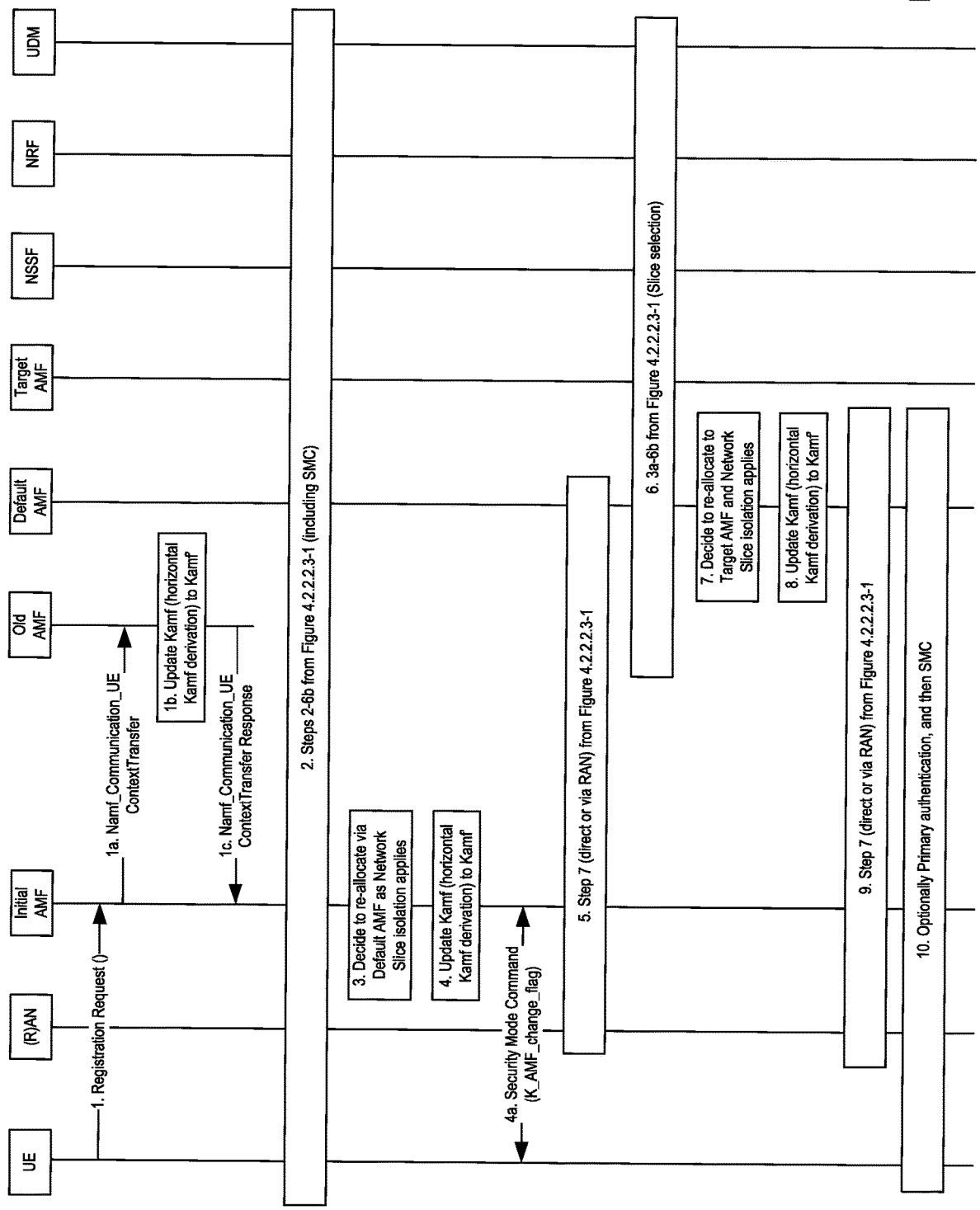
FIG. 5 is a signaling diagram showing derivation of security keys without network slice restrictions.

FIG. 5 depicts a representative signaling diagram depicting another embodiment of a solution, which is based on the observation that the main cause of the problem is that the UE and the network already share security context but the network function which holds the context (Initial AMF) cannot transfer it to the Target AMF, as the security keys are "Network Slice" specific.

The solution, in this embodiment, is for the network to derive new security keys such that the Network Slice specific aspects of them are "removed." This is achieved by network function performing Horizontal key derivation of Kamf. The network function doing this may be at the source side, e.g., the Initial AMF, before the UE MM/security context is transferred to the remote network function (e.g., the Default AMF or the Target AMF). Alternatively, it may be an intermediate network function (e.g., the Default AMF) doing the key derivatintermediate network function transfers the UE MM/Security context to the Target AMF. Initially, the UE initiates a registration (step 1). This is as described above for the first embodiment, except that here, the Registration Request is protected and the Initial AMF interacts with Old AMF to obtain the context and verify the UE message (step 1a). The Old AMF may initiate a horizontal Kamf derivation, so as to not give existing security keys to the Initial AMF, e.g., due to security/slice isolation (step 1b). The Old AMF then responds to the Initial AMF's request (step 1c). The UE registration proceeds per 3GPP TS 23.502, as described above with respect to the first embodiment at step 2. The Initial AMF then decides to re-allocate the UE to another AMF, via the Default AMF, as described above with respect to the first embodiment at step 3.

The Initial AMF may initiate horizontal Kamf derivation, so as to not give existing security keys to the Target AMF, e.g., due to security/slice isolation (step 4). The UE may be updated with new keys (step 4a).

The UE is then re-allocated from the Initial AMF to the Default AMF (step 5), as described above with respect to the first embodiment at steps 4 and 5. If the Default AMF needs to performs Network Slice selection (step 6), e.g., to obtain all information required for re-allocation of the UE to the Target AMF from the Initial AMF, this proceeds as described above with respect to the first embodiment at step 6.

The Default AMF decides to re-allocate the UE to the Target AMF, and that NS isolation applies (step 7). The Initial AMF may initiate a horizontal Kamf derivation, so as to not give existing security keys to the Target AMF, e.g., due to security/slice isolation (step 8). The UE may be updated with the new keys, or the Default AMF indicates to the Target AMF that the keys have changed.

The UE is then Re-allocated from the Initial AMF to the Default AMF (step 9), as described above with respect to the first embodiment at steps 7 and 8. The Default AMF may indicate to the Target AMF that the keys have changed. Primary authentication may optionally then proceed (step 10). The Target AMF indicates a K_AMF_change_flag to UE.

Third Embodiment

Figure 6:
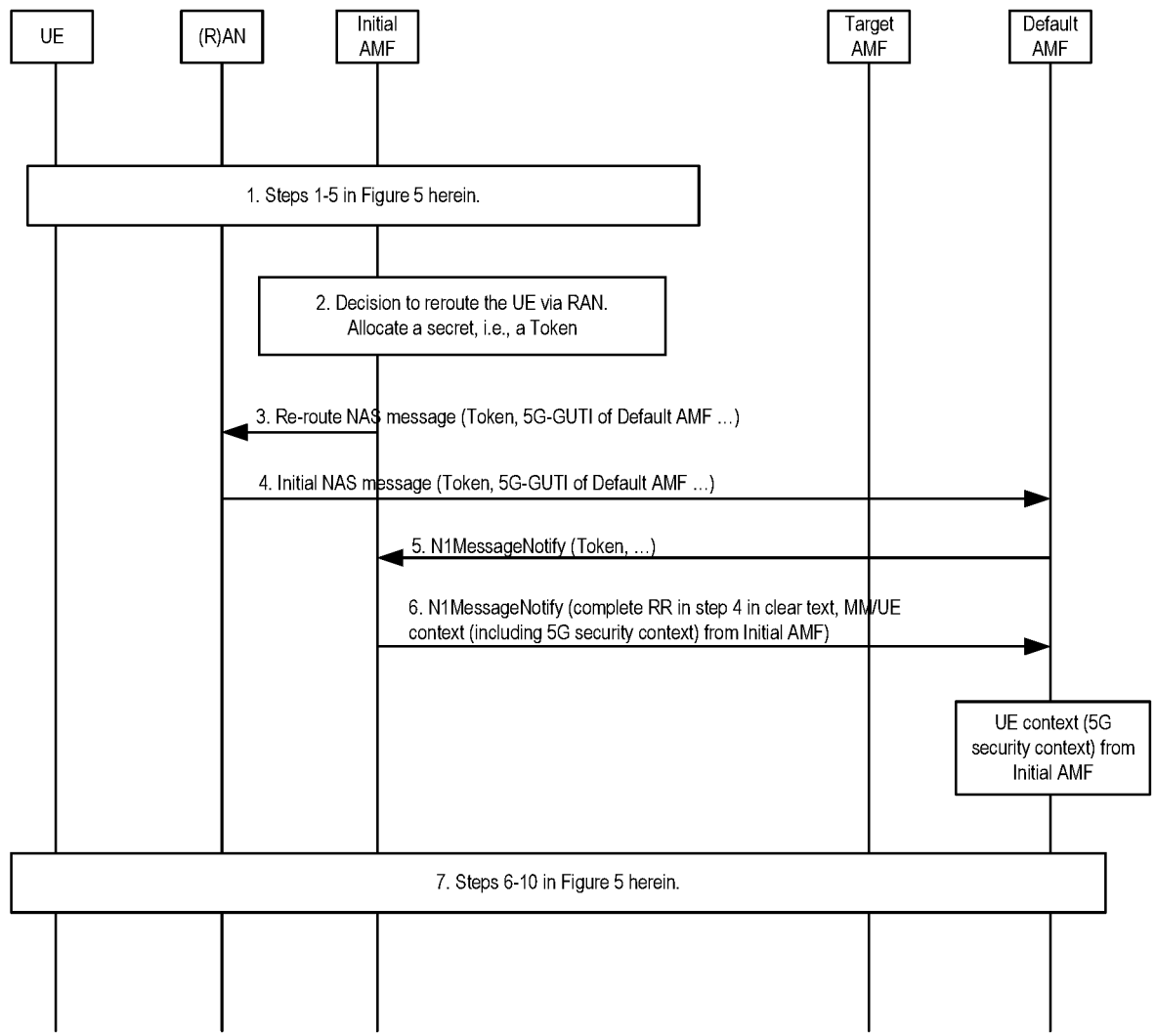
FIG. 6 is a signaling diagram showing the Initial AMF generating and sending a token to the Default AMF.

FIG. 6 depicts a representative signaling diagram depicting a third embodiment of a solution, which is based on the observation that when the Initial AMF decides to perform a re-route of the NAS message as a Registration Request via the RAN, the NAS message should not be sent in clear-text to the RAN.

The initial UE registration proceeds (step 1), as described above with respect to the second embodiment at steps 1-5. The Initial AMF then decides to allocate a secret, for example a Token (step 2), which it includes in a Re-route NAS message to the RAN (step 3). The RAN forwards the Token to the Default AMF (step 4). The Default AMF forwards the Token to the Initial AMF (step 5), and the Initial AMF verifies the Token. If successful, then the Initial AMF sends the complete RR message in clear text received in NAS Security Mode Complete message (not shown in FIG. 6), together with the 5G security context, to the Default AMF (step 6). In this manner, the Default AMF has the UE context, including a 5G security context, from the Initial AMF. The Default AMF then re-allocates the UE to the Target AMF (step 7), as described above with respect to the second embodiment at steps 6-10.

By introducing a secret as a Token in this manner, the Initial AMF does not need to re-route the NAS RR message via the RAN.

Methods and Apparatuses

Figure 7:
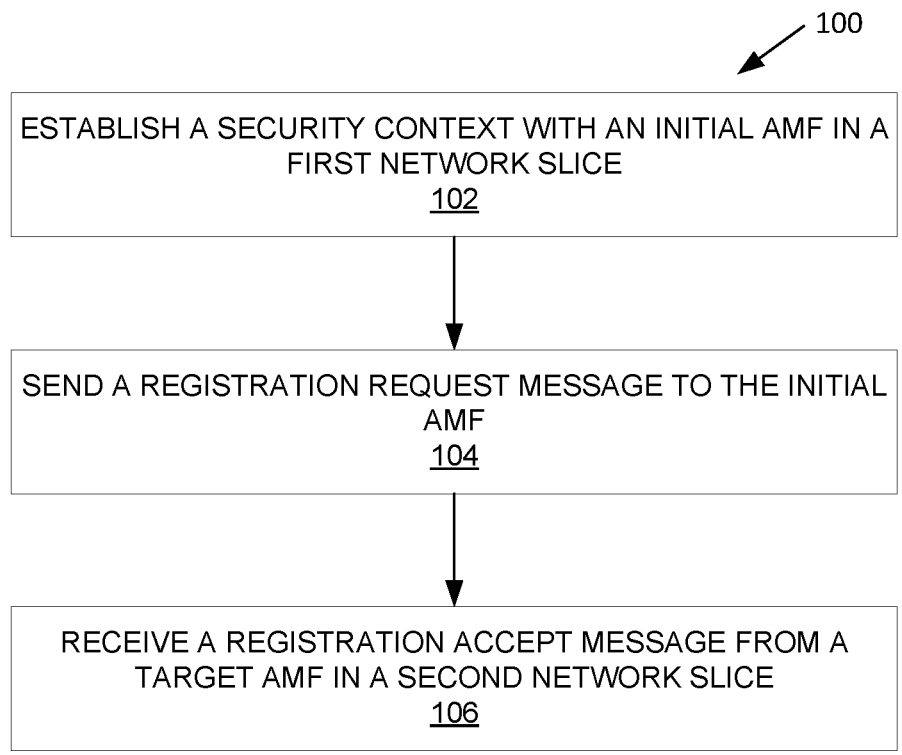
FIG. 7 is a flow diagram of steps in a method of a wireless device registering with a wireless communication network.

FIG. 7 depicts a method 100 in accordance with particular embodiments. The method 100 is performed by a wireless device. The method 100 is for changing an Access and Mobility Management Function (AMF) in a wireless communication network. A security context is established with an Initial AMF in a first network slice (block 102). A registration request message is sent to the Initial AMF (block 104). A registration accept message is received from a Target AMF in a second network slice (block 106). The Initial AMF transferred a security context with the wireless device to the Target AMF via a Default AMF which is able to securely communicate with both the Initial AMF and the Target AMF.

Figure 8:
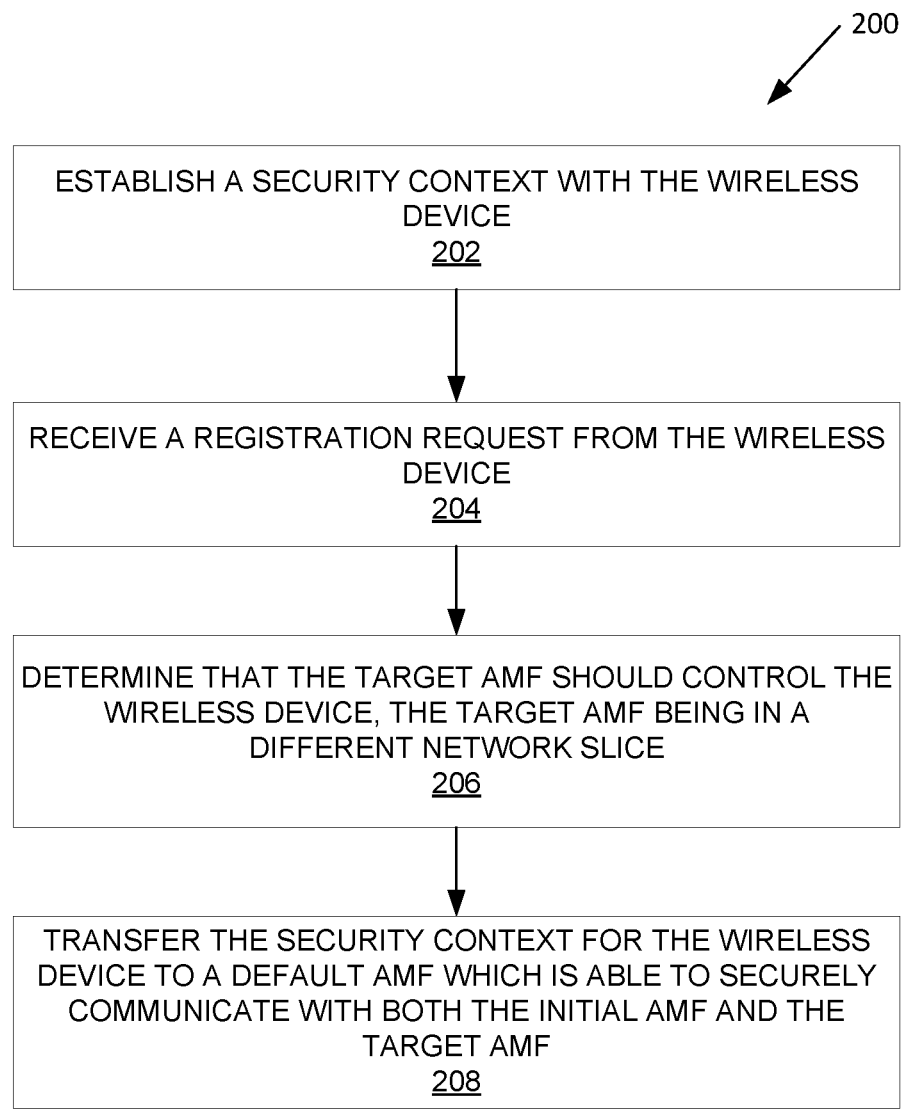
FIG. 8 is a flow diagram of steps in a method of performing registration and AMF re-allocation for a wireless device by an Initial AMF.

FIG. 8 depicts a method 200 in accordance with other particular embodiments. The method 200 is performed by a first core network node performing Initial Access and Mobility Management Function (Initial AMF) for a wireless device. The method 200 is of transferring control of the wireless device to a Target AMF. A Registration Request message is received from the wireless device (block 202). A security context is established with the wireless device (block 204). The first core network node determines that the Target AMF should control the wireless device (block 206). The Target AMF is in a different network slice. The security context for the wireless device is transferred to a Default AMF which is able to securely communicate with both the Initial AMF and the Target AMF (block 208).

Figure 9:
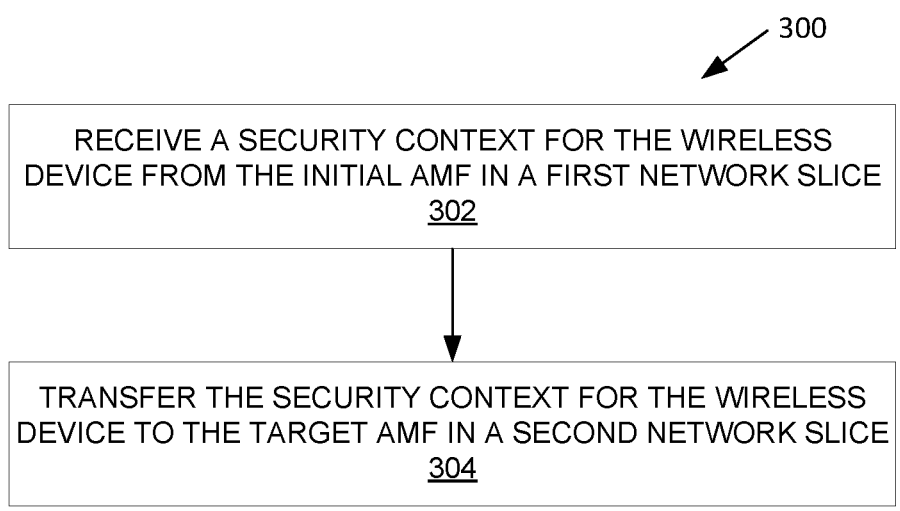
FIG. 9 is a flow diagram of steps in a method of performing AMF re-allocation for a wireless device by a Default AMF.

FIG. 9 depicts a method 300 in accordance with other particular embodiments. The method 300 is performed by a second core network node performing Default Access and Mobility Management Function (AMF) for wireless devices across slices. The method 300 is of transferring control of a wireless device from an Initial AMF to a Target AMF. A security context for the wireless device is received from the Initial AMF in a first network slice (block 302). The security context for the wireless device is transferred to the Target AMF in a second network slice (block 304).

Apparatuses described herein may perform the methods 100, 200, 300 herein and any other processing by implementing any functional means, modules, units, or circuitry. In one embodiment, for example, the apparatuses comprise respective circuits or circuitry configured to perform the steps shown in FIGS. 7-9. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
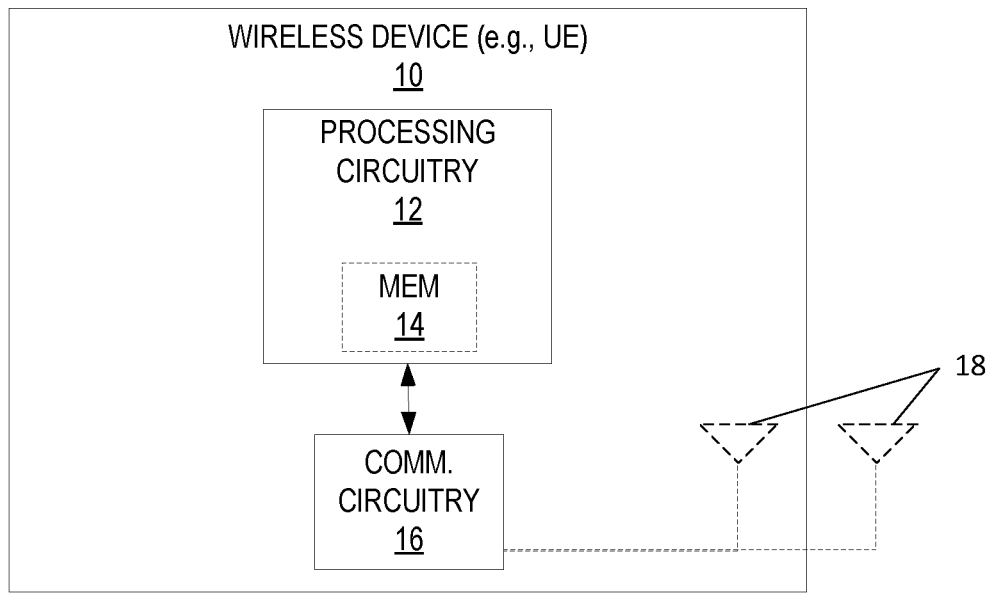
FIG. 10 is a hardware block diagram of a wireless device.

FIG. 10 for example illustrates a schematic block diagram of a wireless device 10 as implemented in accordance with one or more embodiments. As shown, the wireless device 10 includes processing circuitry 12 and communication circuitry 16. The communication circuitry 16 (e.g., radio circuitry) is configured to transmit and/or receive information to and/or from one or more other nodes, e.g., via any communication technology. Such communication may occur via one or more antennas 18 that may be either internal or external to the wireless device 10, as indicated by the dashed lines. The processing circuitry 12 is configured to perform processing described above, such as by executing instructions stored in memory 14. In particular, the processing circuitry 12 may perform the method 100 disclosed herein. The processing circuitry 12 in this regard may implement certain functional means, units, or modules.

Figure 11:
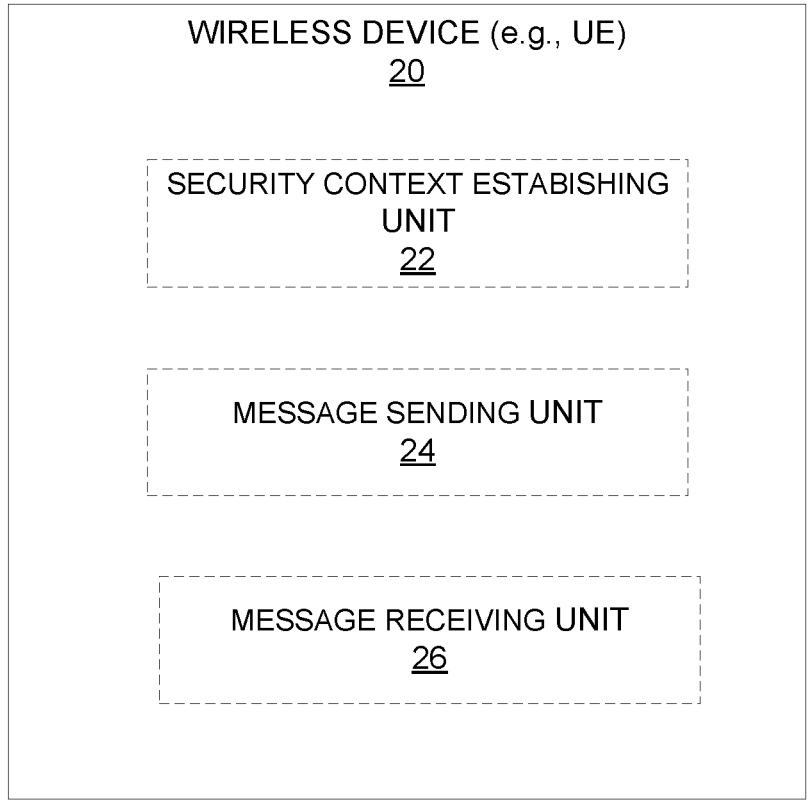
FIG. 11 is a functional block diagram of a wireless device.
Figure 15:
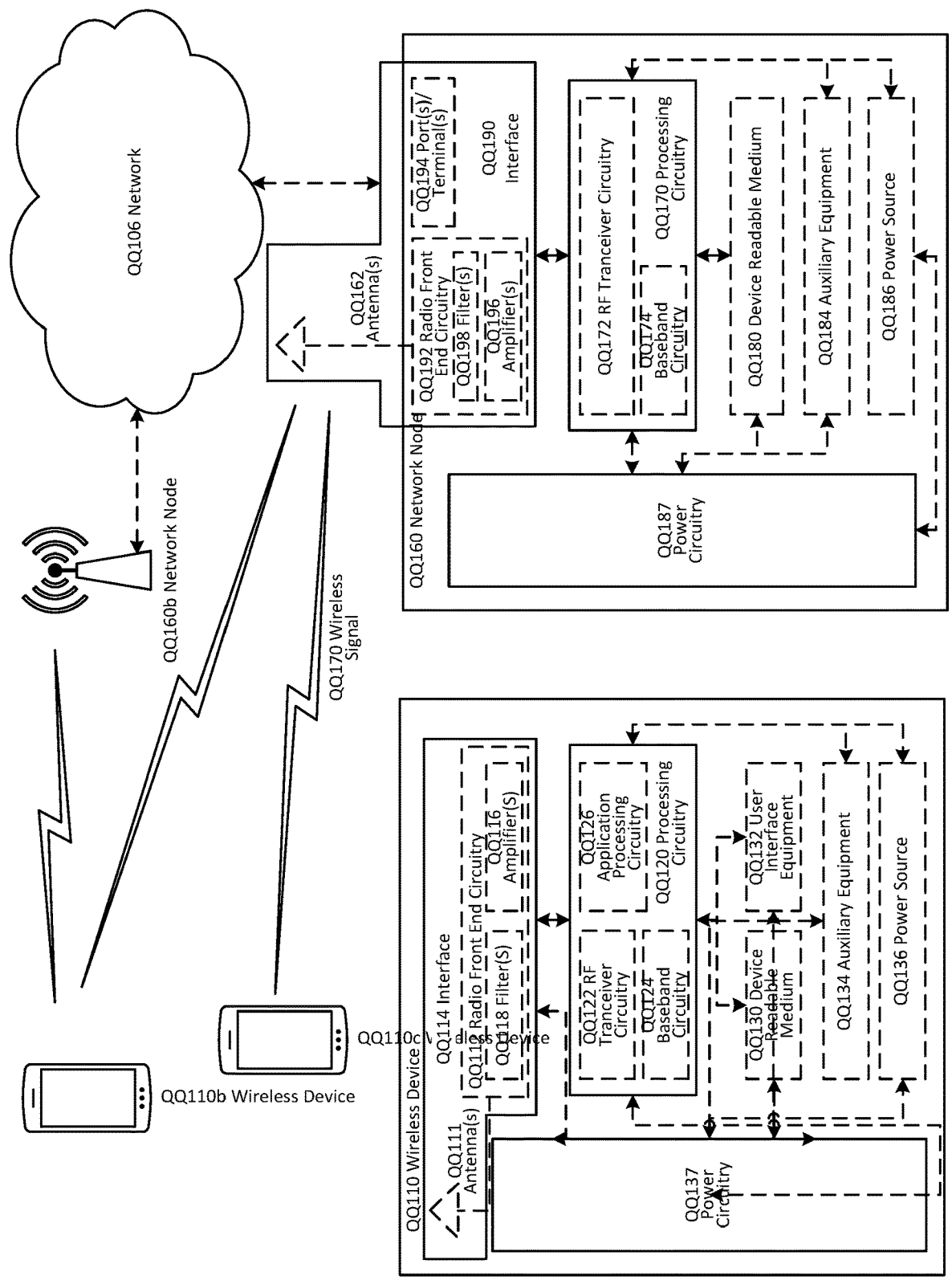
FIG. 15 is a block diagram of a wireless network.

FIG. 11 illustrates a functional block diagram of a wireless device 20 in a wireless network according to still other embodiments (for example, the wireless network shown in FIG. 15). As shown, the wireless device 20 implements various functional means, units, or modules, e.g., via the processing circuitry 12 in FIG. 10 and/or via software code. These functional means, units, or modules, e.g., for implementing the method(s) herein, include for instance: security context establishing unit 22, message sending unit 24, and message receiving unit 26. The security context establishing unit 22 is configured to establish a security context with an Initial AMF in a first network slice. The message sending unit 24 is configured to send a registration request message to the Initial AMF. The message receiving unit 26 is configured to receive a registration accept message from a Target AMF in a second network slice. The Initial AMF transferred a security context with the wireless device to the Target AMF via a Default AMF which is able to securely communicate with both the Initial AMF and the Target AMF.

Figure 12:
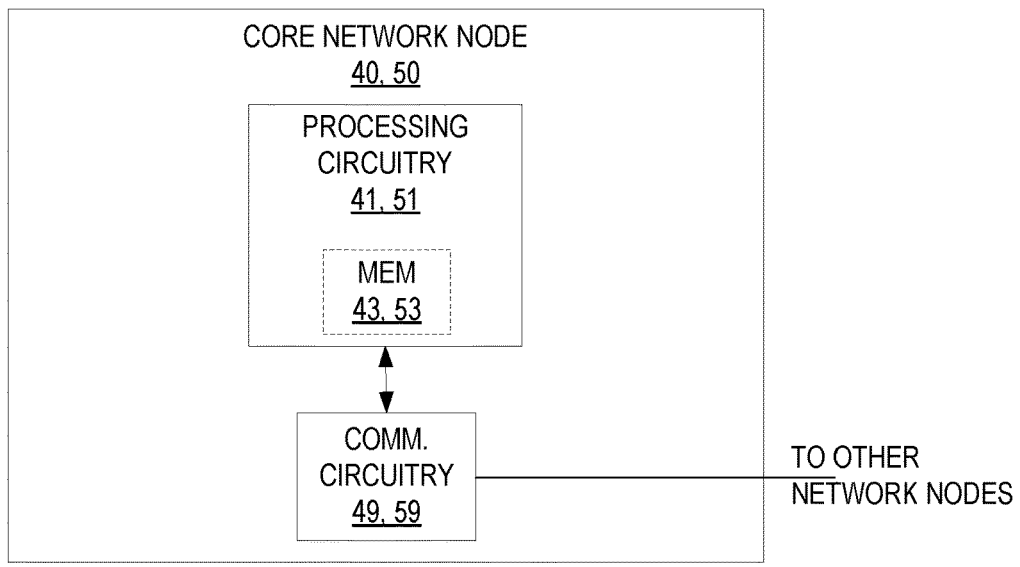
FIG. 12 is a hardware block diagram of a core network node.

FIG. 12 illustrates a schematic block diagram of a core network node 40, 50 as implemented in accordance with one or more embodiments. The core network node may implement an AMF (Access and Mobility Management Function), and the processing circuitry 41, 51 is configured to perform processing described above, such as by executing instructions stored in memory 43, 53, and the communication circuitry 49, 59 is configured to communicate with other nodes.

Figure 13:
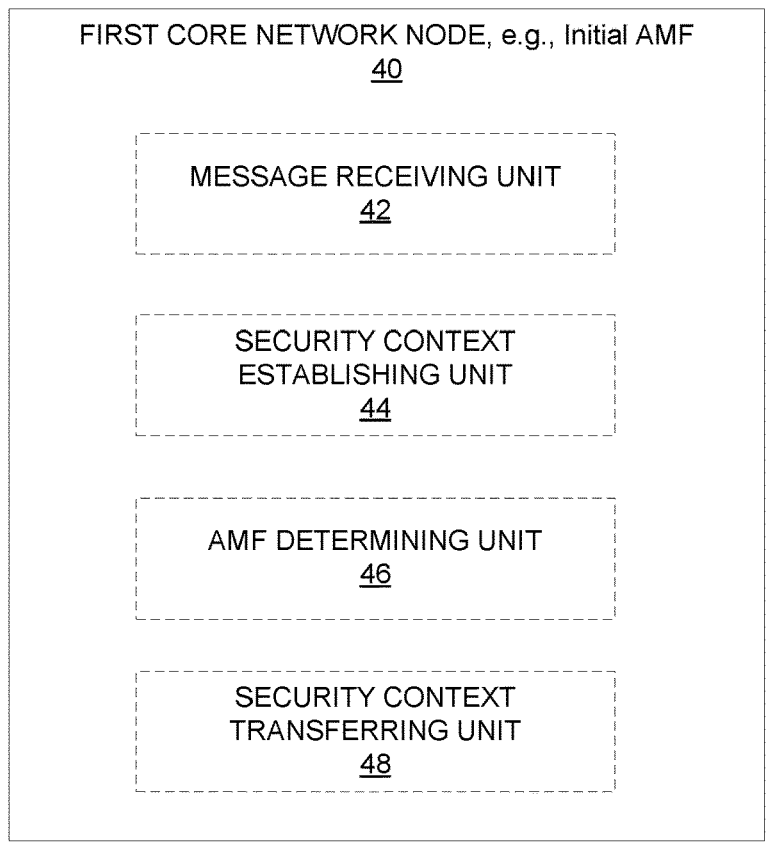
FIG. 13 is a functional block diagram of a first core network node.

FIG. 13 illustrates a functional block diagram of a first core network node 40 in a wireless network according to still other embodiments (for example, the wireless network shown in FIG. 15). The first core network node 40 may implement an Initial AMF for a UE 10, 20. As shown, the core network node 40 implements various functional means, units, or modules. These functional means, units, or modules, e.g., for implementing method 100 herein, include for instance: message receiving unit 42, security context establishing unit 44, AMF determining unit 46, and security context transferring unit 48. The message receiving unit 42 is configured to receive a Registration Request message from a wireless device 10, 20. The security context establishing unit 44 is configured to establish a security context with the wireless device 10, 20. The AMF determining unit 46 is configured to determine that the Target AMF should control the wireless device 10, 20, the Target AMF being in a different network slice. The security context transferring unit 48 is configured to transfer the security context for the wireless device 10, 20 to a Default AMF which is able to securely communicate with both the Initial AMF and the Target AMF.

Figure 14:
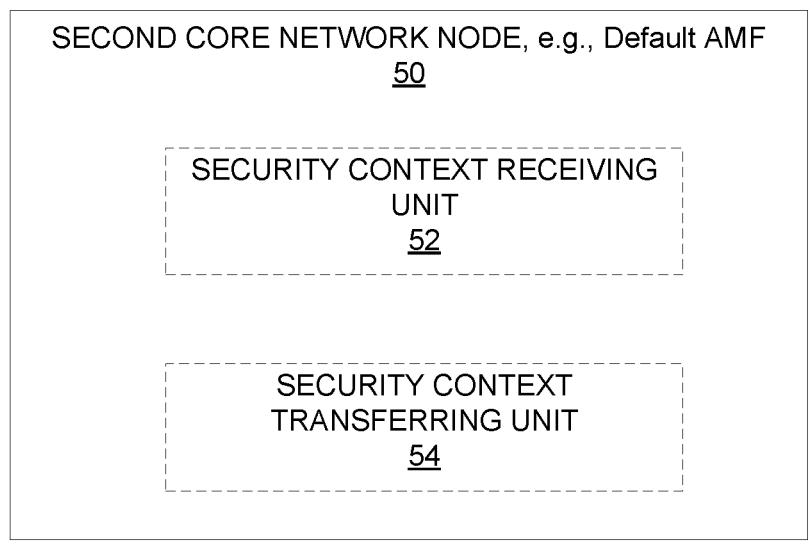
FIG. 14 is a functional block diagram of a second core network node.

FIG. 14 illustrates a functional block diagram of a second core node 50 in a wireless network according to still other embodiments (for example, the wireless network shown in FIG. 15). The second core network node 50 may implement a Default AMF, able to communication with nodes in a plurality of network slices. As shown, the second core network node 50 implements various functional means, units, or modules, and these functional means, units, or modules, e.g., for implementing the method 300 herein, include for instance: security context receiving unit 52 and security context transferring unit 54. The security context receiving unit 52 is configured to receive a security context for the wireless device 10, 20 from the Initial AMF in a first network slice. The security context transferring unit 54 is configured to transfer the security context for the wireless device 10, 20 to the Target AMF in a second network slice.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Network Description and Over the Top (OTT) Data Communication

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network QQ106, network nodes QQ160 and QQ160b, and wireless devices QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, network nodes, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), network nodes (BSs) (e.g., radio network nodes, Node Bs, evolved Node Bs (eNBs) and NR NodeBs (gNBs)). Base stations may be categorized based on the amount of coverage they provide (or, stated differently, their transmit power level) and may then also be referred to as femto network nodes, pico network nodes, micro network nodes, or macro network nodes. A network node may be a relay node or a relay donor node controlling a relay. A network node may also include one or more (or all) parts of a distributed radio network node such as centralized digital units and/or remote radio units (RRUs), sometimes referred to as Remote Radio Heads (RRHs). Such remote radio units may or may not be integrated with an antenna as an antenna integrated radio. Parts of a distributed radio network node may also be referred to as nodes in a distributed antenna system (DAS). Yet further examples of network nodes include multi-standard radio (MSR) equipment such as MSR BSs, network controllers such as radio network controllers (RNCs) or network node controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, network node, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 15 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 16:
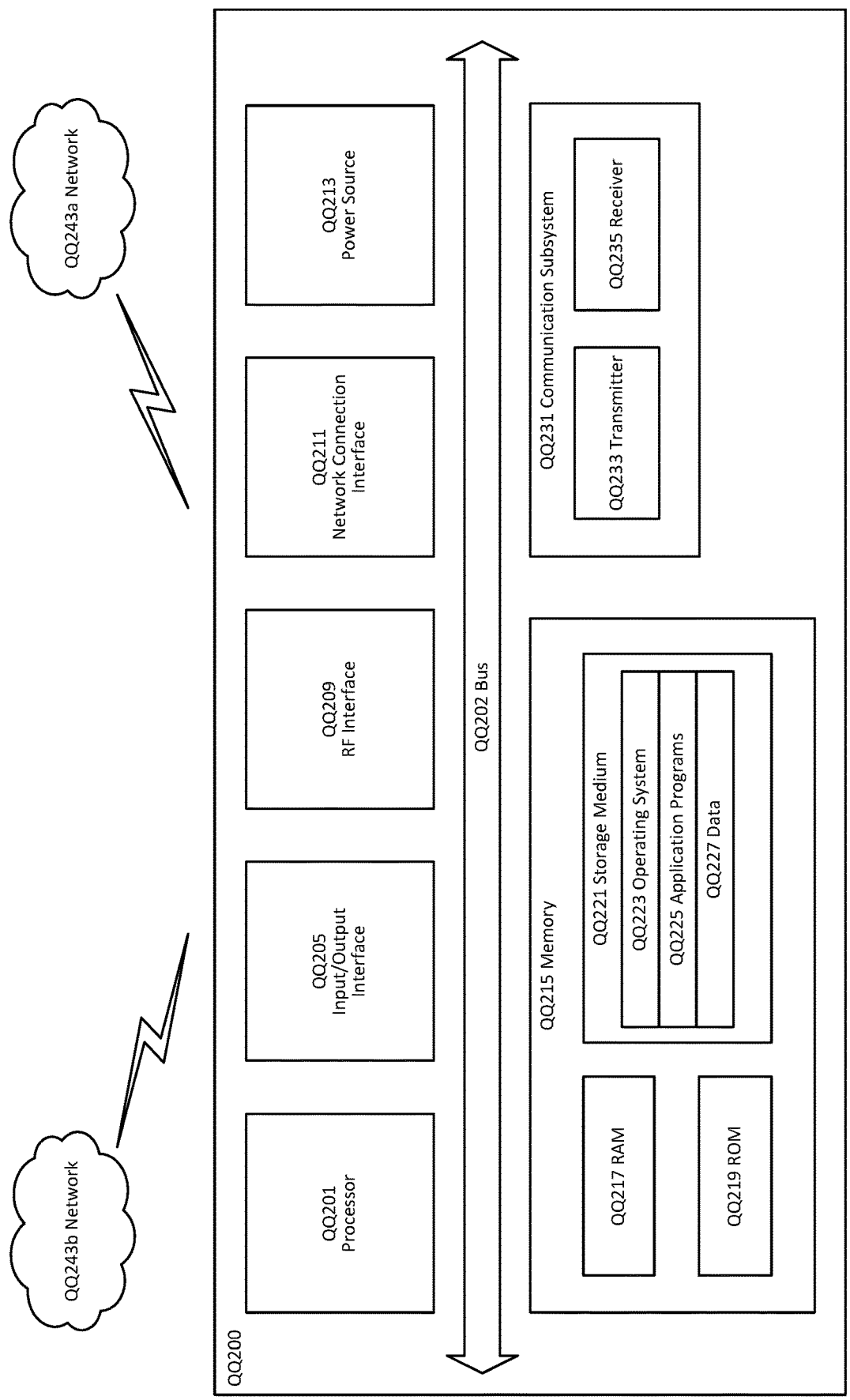
FIG. 16 is a block diagram of a UE.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 16, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or network node of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 17:
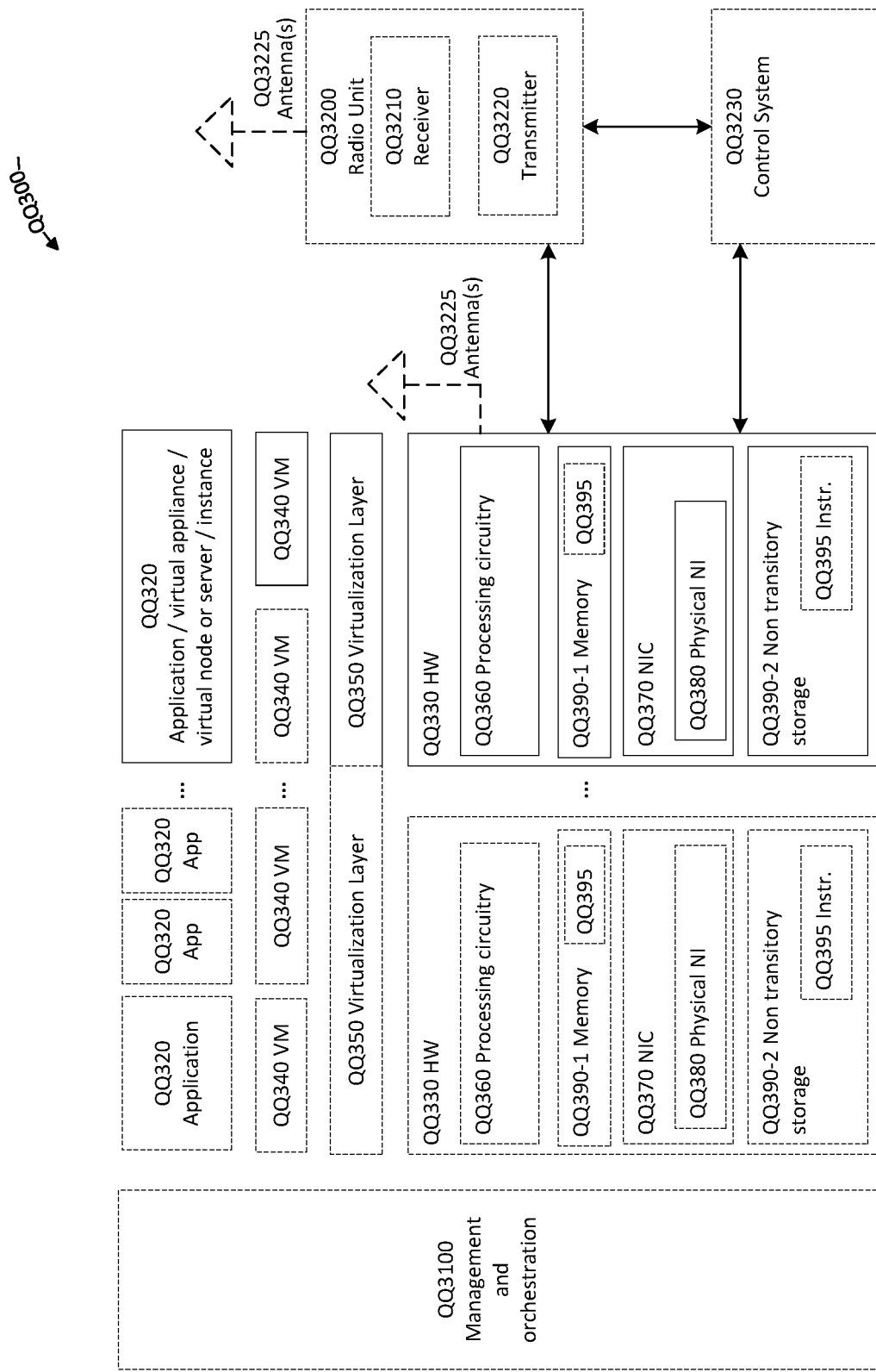
FIG. 17 is a block diagram illustrating a virtualization environment.

FIG. 17 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized network node or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 17, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 17.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a network node.

In some embodiments, some signalling can be effected with the use of control system QQ3230 which may alternatively be used for communication between the hardware nodes QQ330 and radio units QQ3200.

Figure 18:
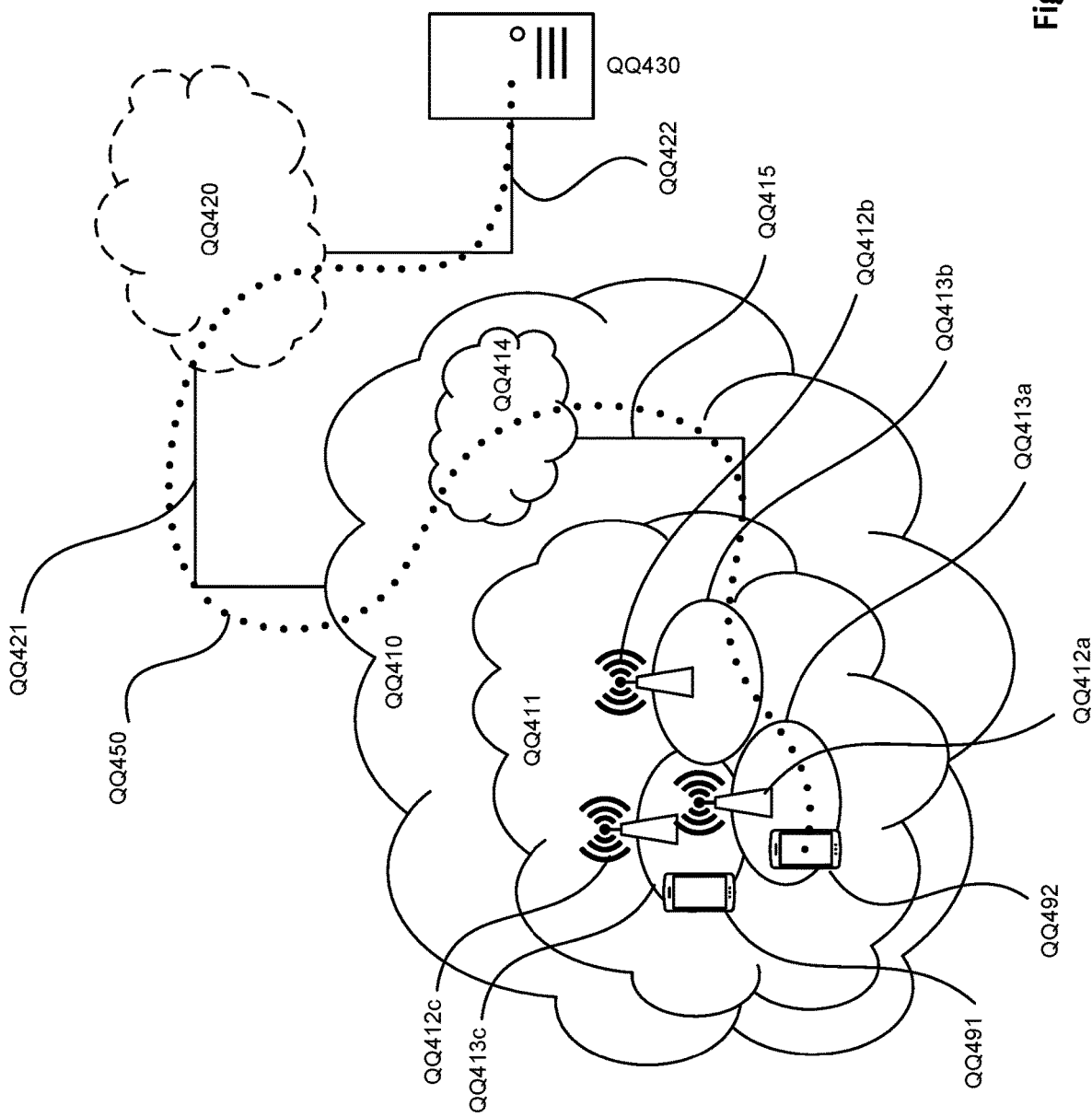
FIG. 18 illustrates a telecommunication network connected via an intermediate network to a host computer.

FIG. 18 illustrates a telecommunication network connected via an intermediate network to a host computer in accordance with some embodiments. In particular, with reference to FIG. 18, in accordance with an embodiment, a communication system includes telecommunication network QQ410, such as a 3GPP-type cellular network, which comprises access network QQ411, such as a radio access network, and core network QQ414. Access network QQ411 comprises a plurality of network nodes QQ412a, QQ412b, QQ412c, such as NBs, eNBs, gNBs or other types of wireless access points, each defining a corresponding coverage area QQ413a, QQ413b, QQ413c. Each network node QQ412a, QQ412b, QQ412c is connectable to core network QQ414 over a wired or wireless connection QQ415. A first UE QQ491 located in coverage area QQ413c is configured to wirelessly connect to, or be paged by, the corresponding network node QQ412c. A second UE QQ492 in coverage area QQ413a is wirelessly connectable to the corresponding network node QQ412a. While a plurality of UEs QQ491, QQ492 are illustrated in this example, the disclosed embodiments are equally applicable to a situation where a sole UE is in the coverage area or where a sole UE is connecting to the corresponding network node QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 18 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, network node QQ412 may not or need not be informed about the past routing of an incoming downlink communication with data originating from host computer QQ430 to be forwarded (e.g., handed over) to a connected UE QQ491. Similarly, network node QQ412 need not be aware of the future routing of an outgoing uplink communication originating from the UE QQ491 towards the host computer QQ430.

Figure 19:
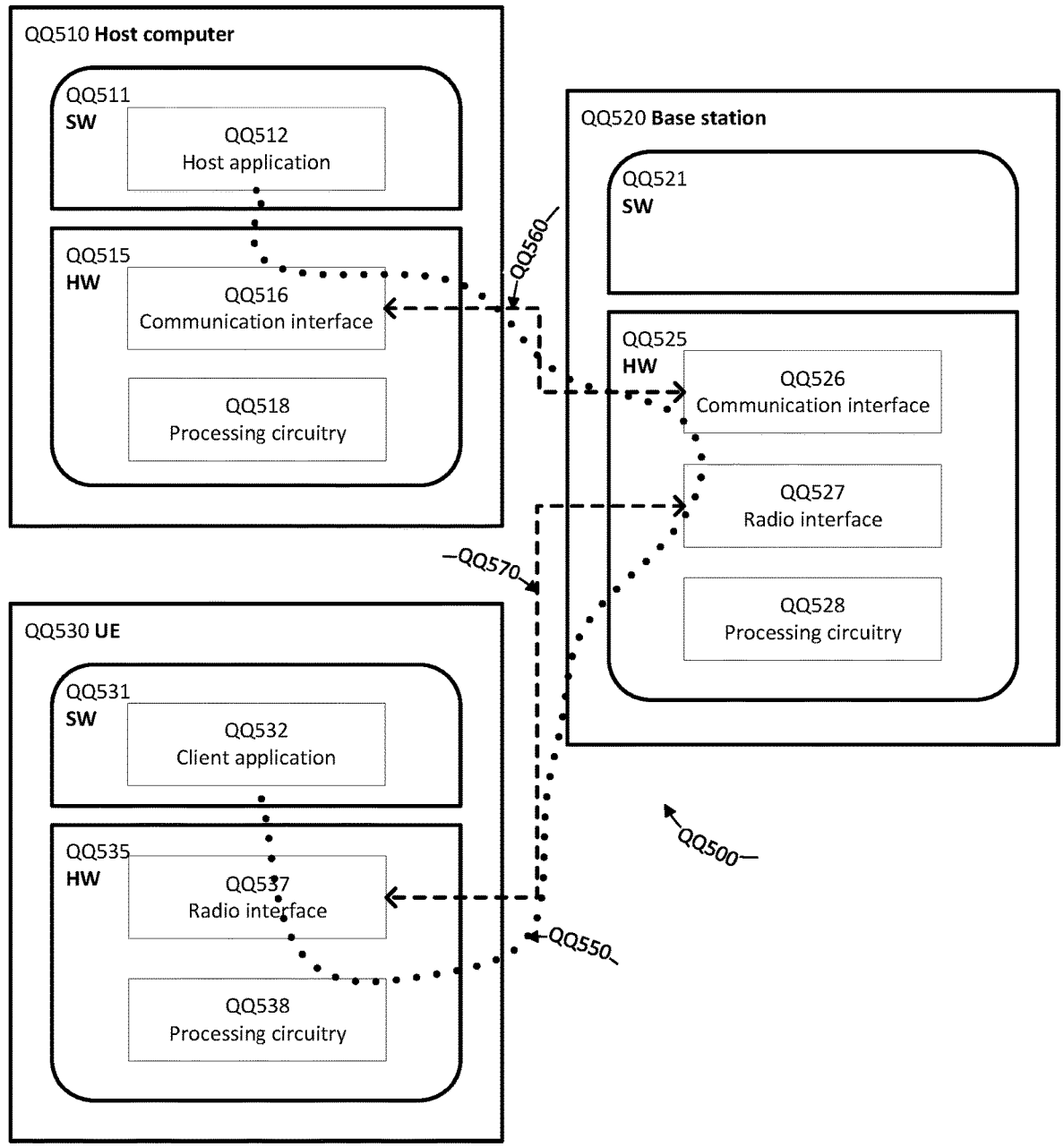
FIG. 19 illustrates host computer communicating via a base station with a user equipment over a partially wireless connection.

Example implementations, in accordance with an embodiment, of the UE, network node and host computer discussed in the preceding paragraphs will now be described with reference to FIG. 19. FIG. 19 illustrates host computer communicating via a network node with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes network node QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by network node QQ520. Communication interface QQ526 may be configured to facilitate connection QQ560 to host computer QQ510. Connection QQ560 may be direct or it may pass through a core network (not shown in FIG. 19) of the telecommunication system and/or through one or more intermediate networks outside the telecommunication system. In the embodiment shown, hardware QQ525 of network node QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection. Communication system QQ500 further includes UE QQ530 already referred to. Its hardware QQ535 may include radio interface QQ537 configured to set up and maintain wireless connection QQ570 with a network node serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, network node QQ520 and UE QQ530 illustrated in FIG. 19 may be similar or identical to host computer QQ430, one of network nodes QQ412a, QQ412b, QQ412c and one of UEs QQ491, QQ492 of FIG. 18, respectively. This is to say, the inner workings of these entities may be as shown in FIG. 19 and independently, the surrounding network topology may be that of FIG. 18.

In FIG. 19, OTT connection QQ550 has been drawn abstractly to illustrate the communication between host computer QQ510 and UE QQ530 via network node QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and network node QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the efficiency in network slice environments, and thereby provide benefits such as reduced user waiting time, better responsiveness, reduced interference, enhanced security, and extended battery lifetime.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect network node QQ520, and it may be unknown or imperceptible to network node QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 20:
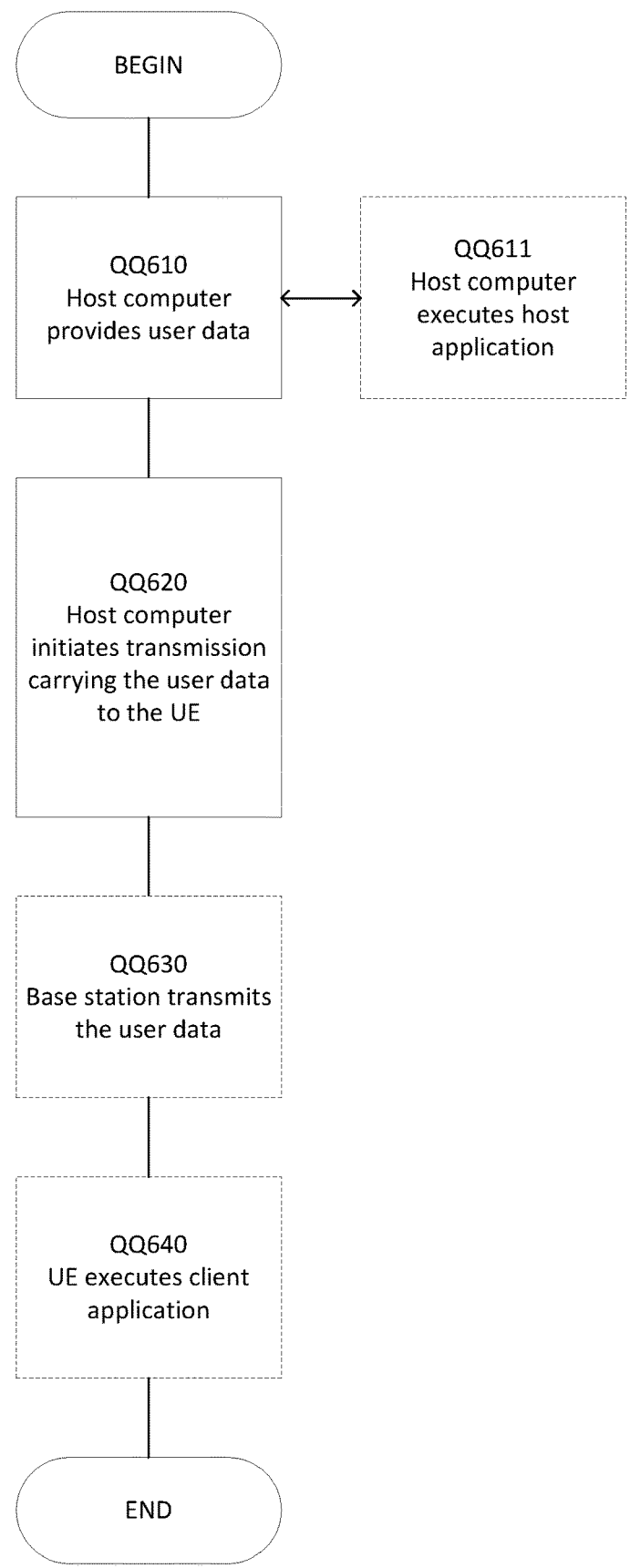
FIG. 20 is a flowchart illustrating a method implemented in a communication system.

FIG. 20 is a flowchart illustrating a method implemented in a communication system, in accordance with one embodiment. The communication system includes a host computer, a network node and a UE which may be those described with reference to Figures QQ4 and QQ5. For simplicity of the present disclosure, only drawing references to FIG. 20 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the network node transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 21:
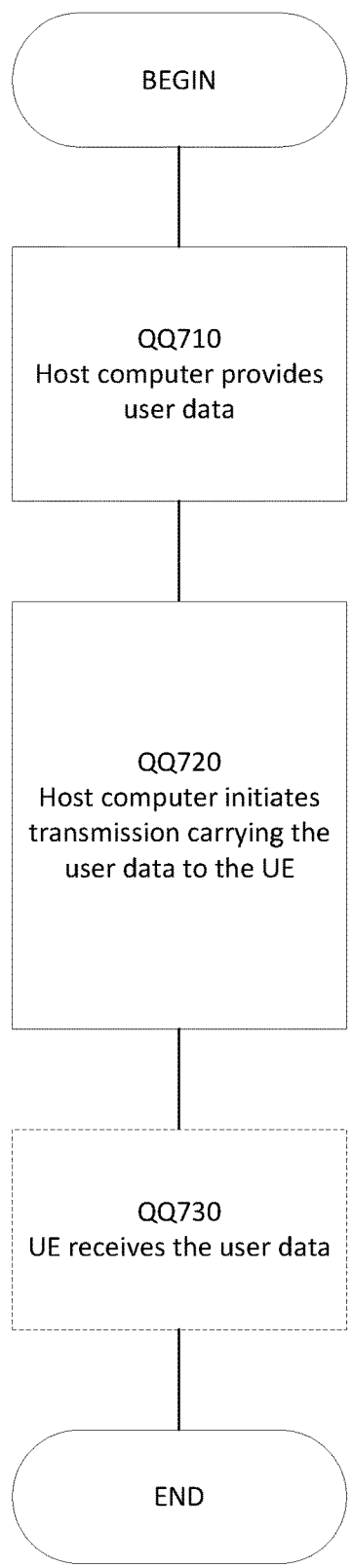
FIG. 21 is a flowchart illustrating another method implemented in a communication system.

FIG. 21 is a flowchart illustrating a method implemented in a communication system, in accordance with one embodiment. The communication system includes a host computer, a network node and a UE which may be those described with reference to Figures QQ4 and QQ5. For simplicity of the present disclosure, only drawing references to FIG. 21 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the network node, in accordance with the teachings of the embodiments described throughout this disclosure. In step QQ730 (which may be optional), the UE receives the user data carried in the transmission.

Figure 22:
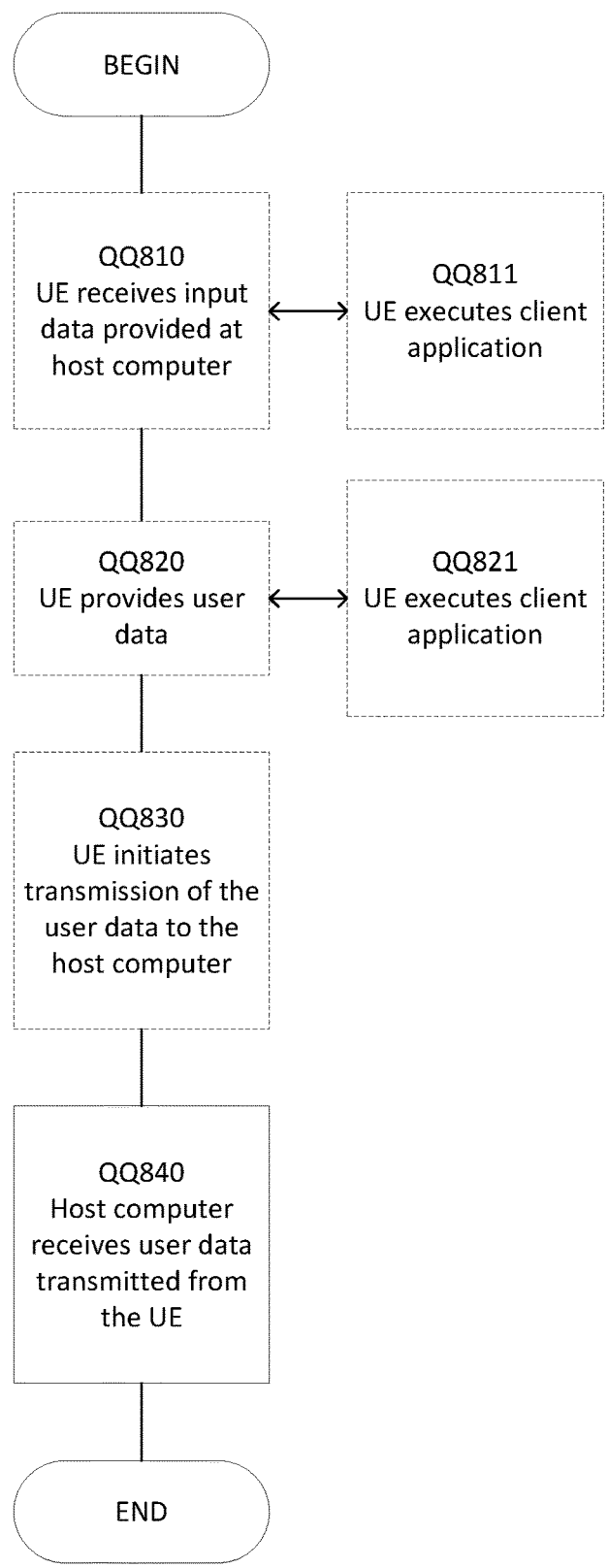
FIG. 22 is a flowchart illustrating yet another method implemented in a communication system.

FIG. 22 is a flowchart illustrating a method implemented in a communication system, in accordance with one embodiment. The communication system includes a host computer, a network node and a UE which may be those described with reference to Figures QQ4 and QQ5. For simplicity of the present disclosure, only drawing references to FIG. 22 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 23:
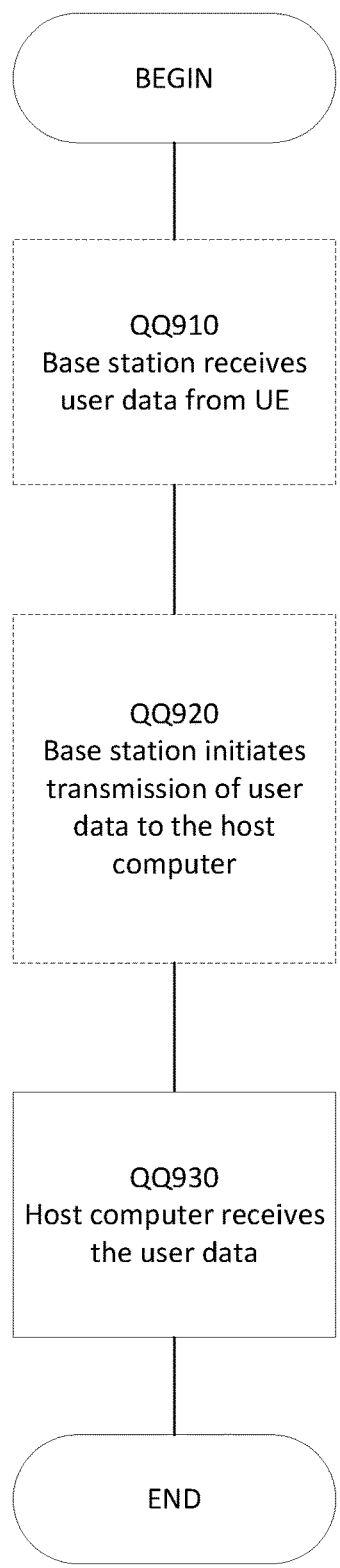
FIG. 23 is a flowchart illustrating still another method implemented in a communication system.

FIG. 23 is a flowchart illustrating a method implemented in a communication system, in accordance with one embodiment. The communication system includes a host computer, a network node and a UE which may be those described with reference to Figures QQ4 and QQ5. For simplicity of the present disclosure, only drawing references to FIG. 23 will be included in this section. In step QQ910 (which may be optional), in accordance with the teachings of the embodiments described throughout this disclosure, the network node receives user data from the UE. In step QQ920 (which may be optional), the network node initiates transmission of the received user data to the host computer. In step QQ930 (which may be optional), the host computer receives the user data carried in the transmission initiated by the network node.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description. As used herein, a network node may be a network node that performs wireless communication with one or more wireless devices. Alternatively, a network node may comprise part of the Core Network, and may communicate only with other network nodes. In particular, a network node may implement one or more Network Functions, including an Access and Mobility Management Function (AMF).

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

EMBODIMENTS

Group A Embodiments

1. A method performed by a wireless device for changing an Access and Mobility Management Function (AMF) in a wireless communication network, the method comprising:
   establishing a security context with an Initial AMF in a first network slice;
   sending a registration request message to the Initial AMF; and
   receiving a registration accept message from a Target AMF in a second network slice;
   wherein the Initial AMF transferred a security context with the wireless device to the Target AMF via a Default AMF which is able to securely communicate with both the Initial AMF and the Target AMF.

2. The method of embodiment 1 wherein the registration request message includes network slicing information.

3. The method of embodiment 2 wherein the slicing information comprises a Network Slice Selection Assistance Information (NSSAI).

4. The method of embodiment 1 wherein the registration accept message is a AUTHENTICATION REQUEST (AUTHRQ) message protected according to the security context between the wireless device and the Initial AMF.

AA. The method of any of the previous embodiments, further comprising:
   providing user data; and
   forwarding the user data to a host computer via the transmission to the base station.

Group B1 Embodiments

20. A method, performed by a first core network node performing Initial Access and Mobility Management Function (Initial AMF) for a wireless device, of transferring control of the wireless device to a Target AMF, the method comprising:
   establishing a security context with the wireless device;
   receiving a Registration Request message from the wireless device;
   determining that the Target AMF should control the wireless device, the Target AMF being in a different network slice; and
   transferring the security context for the wireless device to a Default AMF which is able to securely communicate with both the Initial AMF and the Target AMF.

21. The method of embodiment 20, wherein determining that the Target AMF should control the wireless device comprises making the determination based on local configured information.

22. The method of embodiment 20, wherein determining that the Target AMF should control the wireless device comprises making the determination based on information received from a Network Slice Selection Function (NSSF).

23. The method of embodiment 22, wherein the information received from NSSF includes the network address of the Default AMF.

24. The method of embodiment 23, wherein the information received from NSSF further includes the network address of the Target AMF.

25. The method of embodiment 20, wherein transferring the security context for the wireless device to a Default AMF comprises sending a message directly to the Default AMF.

26. The method of embodiment 25, wherein the message is N1MessageNotify.

27. The method of embodiment 25, wherein the message includes a network address of the Target AMF.

28. The method of embodiment 20, wherein transferring the security context for the wireless device to a Default AMF comprises sending a message to the Default AMF via a Radio Access Network (RAN).

29. The method of embodiment 28 wherein the message includes a Globally Unique AMF Identifier (GUAMI) of the Initial AMF; and further comprising:
   receiving a request from the Default AMF for the security context; and
   in response to the request, sending the security context for the wireless device to the Default AMF.

30. The method of embodiment 28 further comprising cryptographically protecting the message prior to sending it to the Default AMF via the RAN.

31. The method of embodiment 28 further comprising, prior to transferring the security context for the wireless device to the Default AMF:
   sending the Default AMF a cryptographic token;
   receiving from the Default AMF the cryptographic token;
   verifying the authenticity of the cryptographic token; and
   in response to verifying the authenticity of the cryptographic token, sending a Registration Request message to the Default AMF in clear text with the security context.

32. The method of embodiment 20 further comprising:
   deriving security keys for securely communicating the security context prior to transferring the security context for the wireless device to a Default AMF.

BB1. The method of any of the previous embodiments, further comprising:
   obtaining user data; and
   forwarding the user data to a host computer or a wireless device.

Group B2 Embodiments

40. A method, performed by a second core network node performing Default Access and Mobility Management Function (Default AMF) for wireless devices across network slices, of transferring control of the wireless device from an Initial AMF to a Target AMF, the method comprising:
   receiving a security context for the wireless device from the Initial AMF in a first network slice; and
   transferring the security context for the wireless device to the Target AMF in a second network slice.

41. The method of embodiment 40, wherein receiving the security context for the wireless device from the Initial AMF comprises receiving the security context in a message directly from the Initial AMF.

42. The method of embodiment 41, wherein the message is N1MessageNotify.

43. The method of embodiment 41, wherein the message includes a network address of the Target AMF.

44. The method of embodiment 40, wherein receiving the security context for the wireless device from the Initial AMF comprises receiving the security context from the Initial AMF via a Radio Access Network (RAN).

45. The method of embodiment 44 wherein the message includes a Globally Unique AMF Identifier (GUAMI) of the Initial AMF; and further comprising:
   sending a request to the Initial AMF for the security context; and
   in response to the request, receiving the security context for the wireless device from the Initial AMF.

46. The method of embodiment 28 wherein the message is cryptographically protected prior to being sent by the Initial AMF to the RAN.

47. The method of embodiment 40 further comprising:
   deriving security keys for securely communicating the security context prior to transferring the security context for the wireless device to the Target AMF.

BB2. The method of any of the previous embodiments, further comprising:
   obtaining user data; and
   forwarding the user data to a host computer or a wireless device.

Group C Embodiments

C1. A wireless device configured to perform any of the steps of any of the Group A embodiments.

C2. A wireless device comprising:
   processing circuitry configured to perform any of the steps of any of the Group A embodiments; and
   power supply circuitry configured to supply power to the wireless device.

C3. A wireless device comprising:
   processing circuitry and memory, the memory containing instructions executable by the processing circuitry whereby the wireless device is configured to perform any of the steps of any of the Group A embodiments.

C4. A user equipment (UE) comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A core network node configured to perform any of the steps of any of the Group B1 or Group B2 embodiments.

C8. A core network node comprising:
   processing circuitry configured to perform any of the steps of any of the Group B1 or Group B2 embodiments;
   power supply circuitry configured to supply power to the wireless device.

C9. A core network node comprising:
   processing circuitry and memory, the memory containing instructions executable by the processing circuitry whereby the network node is configured to perform any of the steps of any of the Group B1 or Group B2 embodiments.

C10. A computer program comprising instructions which, when executed by at least one processor of a network node, causes the network node to carry out the steps of any of the Group B1 or Group B2 embodiments.

C11. A carrier containing the computer program of embodiment C10, wherein the carrier is one of an electronic signal, optical signal, radio signal, or computer readable storage medium.

The invention claimed is:

1. A wireless device operative in a wireless communication network, the wireless device comprising:
   processing circuitry; and
   communication circuitry operatively connected to the processing circuitry;
   wherein the processing circuitry is configured to cause the wireless device to establish a security context with a Target Access and Mobility Management Function (AMF) that is in a second network slice by sending a registration request message to an Initial AMF that is in a first network slice and is unable to communicate with the Target AMF; and
   wherein the Initial AMF and the Target AMF are both able to securely communicate with a Default AMF.

2. The wireless device of claim 1, wherein the registration request message includes network slicing information.

3. The wireless device of claim 1, wherein the registration accept message is protected according to the security context between the wireless device and the Initial AMF.

4. A first core network node operative as an Initial Access and Mobility Management Function (Initial AMF) for a wireless device for transferring control of the wireless device to a Target AMF; the first core network node comprising:
   processing circuitry; and
   communication circuitry operatively connected to the processing circuitry;
   wherein the processing circuitry is configured to cause the first core network node to:
      establish a security context with the wireless device;
      receive a Registration Request message from the wireless device;
      determine that the Target AMF should control the wireless device, the Target AMF being in a different network slice; and
      transfer the security context for the wireless device to a Default AMF which is able to securely communicate with both the Initial AMF and the Target AMF.

5. The first core network node of claim 4, wherein the processing circuitry is configured to cause the first core network node to determine that the Target AMF should control the wireless device by making the determination based local configured information or information received from a Network Slice Selection Function (NSSF).

6. The first core network node of claim 5, wherein the information received from NSSF includes the network address of one or both of the Default AMF and the Target AMF.

7. The first core network node of claim 4, wherein the processing circuitry is configured to cause the first core network node to transfer the security context for the wireless device to a Default AMF by sending a message directly to the Default AMF or sending a message to the Default AMF via a Radio Access Network.

8. The first core network node of claim 7:
   wherein the message includes a Globally Unique AMF Identifier of the Initial AMF; and
   wherein the processing circuitry is configured to cause the first core network node to:
      receive a request from the Default AMF for the security context; and
      send, in response to the request from the Default AMF for the security context, the security context for the wireless device to the Default AMF.

9. The first core network node of claim 8, wherein the processing circuitry is configured to cause the first core network node to, prior to sending the security context for the wireless device to the Default AMF:
   send the Default AMF a cryptographic token;
   receive the cryptographic token from the Default AMF;
   verify the authenticity of the cryptographic token; and
   send, in response to verifying the authenticity of the cryptographic token, a Registration Request message to the Default AMF in clear text with the security context.

10. The first core network node of claim 4, wherein the processing circuitry is configured to cause the first core network node to derive security keys for securely communicating the security context prior to transferring the security context for the wireless device to a Default AMF.

11. A second core network node operative as a Default Access and Mobility Management Function (Default AMF) for a wireless device across network slices for transferring control of the wireless device from an Initial AMF to a Target AMF, the second core network node comprising:
   processing circuitry; and
   communication circuitry operatively connected to the processing circuitry;
   wherein the processing circuitry is configured to cause the second core network node to:
      receive a security context for the wireless device from the Initial AMF in a first network slice; and
      transfer the security context for the wireless device to the Target AMF in a second network slice.

12. The second core network node of claim 11, wherein the processing circuitry is configured to cause the second core network node to receive the security context for the wireless device from the Initial AMF by receiving the security context in a message directly from the Initial AMF or receiving the security context from the Initial AMF via a Radio Access Network.

13. The second core network node of claim 12:
   wherein the message includes a Globally Unique AMF Identifier of the Initial AMF; and
   wherein the processing circuitry is configured to cause the second core network node to:
      send a request to the Initial AMF for the security context; and
      receive, in response to the request, the security context for the wireless device from the Initial AMF.

14. The second core network node of claim 11, wherein the processing circuitry is configured to cause the second core network node to derive security keys for securely communicating the security context prior to transferring the security context for the wireless device to the Target AMF.

* * * * *